(12) United States Patent
Kojima et al.

(10) Patent No.: US 8,586,647 B2
(45) Date of Patent: Nov. 19, 2013

(54) RECORDING INK, RECORDING INK SET, RECORDS, INK CARTRIDGE, RECORDING METHOD, AND INKJET RECORDING APPARATUS

(75) Inventors: Mariko Kojima, Komae (JP); Akihiko Gotoh, Atsugi (JP); Michihiko Namba, Yokohama (JP); Kiyofumi Nagai, Machida (JP); Naoya Morohoshi, Numazu (JP); Tohru Ohshima, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 950 days.

(21) Appl. No.: 12/091,234

(22) PCT Filed: Oct. 24, 2006

(86) PCT No.: PCT/JP2006/321596
§ 371 (c)(1),
(2), (4) Date: Apr. 23, 2008

(87) PCT Pub. No.: WO2007/049782
PCT Pub. Date: May 3, 2007

(65) Prior Publication Data
US 2009/0263632 A1 Oct. 22, 2009

(30) Foreign Application Priority Data
Oct. 24, 2005 (JP) .................... 2005-308961

(51) Int. Cl.
*C09D 11/10* (2006.01)
(52) U.S. Cl.
USPC ..... 523/160; 523/161; 428/195.1; 106/31.13; 524/377; 427/256; 347/6; 347/100; 347/54

(58) Field of Classification Search
USPC .................................. 523/160, 161
See application file for complete search history.

(56) References Cited

U.S. PATENT DOCUMENTS 5,085,698 A * 2/1992 Ma et al. .................. 524/388
6,033,463 A * 3/2000 Yui et al. .................. 106/31.27

(Continued)

FOREIGN PATENT DOCUMENTS

CN 1628157 A 6/2005
EP 1 262 529 A1 12/2002

(Continued)

OTHER PUBLICATIONS

The European Search Report issued May 4, 2011, in Application No. / Patent No. 06822553.1 2102 / 1940979.

(Continued)

*Primary Examiner* — Doris Lee
(74) *Attorney, Agent, or Firm* — Oblon, Spivak, McClelland, Maier & Neustadt, L.L.P.

(57) ABSTRACT

The present invention provides a recording ink set containing a black ink, a cyan ink, a magenta ink, and a yellow ink, each of which contains water, a water-insoluble color material, a water-soluble organic solvent, and a surfactant, wherein the black ink and at least one of the inks other than the black ink respectively contain a different water-soluble organic solvent; and the surface tension of the water-soluble organic solvent(s) used only for the inks other than the black ink is higher than that of the water-soluble organic solvent used only for the black ink; and the present invention also provides a recording method using the recording ink set.

16 Claims, 6 Drawing Sheets

(56) References Cited

U.S. PATENT DOCUMENTS

| | | | |
|---|---|---|---|
| 6,419,883 B1 * | 7/2002 | Blanchard | 422/134 |
| 6,511,173 B2 * | 1/2003 | Suzuki et al. | 347/106 |
| 6,523,947 B2 * | 2/2003 | Koga et al. | 347/100 |
| 7,919,544 B2 * | 4/2011 | Matsuyama et al. | 523/160 |
| 2003/0071883 A1 * | 4/2003 | Suzuki et al. | 347/100 |
| 2003/0107632 A1 | 6/2003 | Arita et al. | |
| 2004/0155946 A1 | 8/2004 | Nagai | |
| 2004/0176497 A1 | 9/2004 | Segawa et al. | |
| 2005/0045062 A1 * | 3/2005 | Ogasawara et al. | 106/31.27 |
| 2005/0054751 A1 * | 3/2005 | Namba et al. | 523/160 |
| 2005/0128272 A1 | 6/2005 | Morohoshi et al. | |
| 2006/0176349 A1 | 8/2006 | Nagai et al. | |
| 2008/0070008 A1 | 3/2008 | Namba et al. | |
| 2008/0273045 A1 | 11/2008 | Morohoshi et al. | |

FOREIGN PATENT DOCUMENTS

| | | |
|---|---|---|
| EP | 1 405 882 A1 | 4/2004 |
| JP | 9 183224 | 7/1997 |
| JP | 2002 275402 | 9/2002 |
| JP | 2003-165267 A | 6/2003 |
| JP | 2003-213179 | 7/2003 |
| JP | 2003 321631 | 11/2003 |
| JP | 2004-82709 A | 3/2004 |
| JP | 2004 338392 | 12/2004 |
| JP | 2004 352996 | 12/2004 |
| JP | 2005-82631 | 3/2005 |
| JP | 2005-144905 A | 6/2005 |
| JP | 2005 154605 | 6/2005 |
| JP | 2005 154607 | 6/2005 |
| WO | WO 2005/028576 A1 | 3/2005 |
| WO | WO 2006/030930 A1 | 3/2006 |

OTHER PUBLICATIONS

Chinese Office Action issued Mar. 8, 2011, in Patent Application No. 200680045324.0.

Japanese Office Action issued Oct. 18, 2012 in Patent Application No. 2006-288912.

Japanese Office Action issued Apr. 18, 2013, in Japan Patent Application No. 2006-288912.

* cited by examiner

RECORDING INK, RECORDING INK SET, RECORDS, INK CARTRIDGE, RECORDING METHOD, AND INKJET RECORDING APPARATUS

TECHNICAL FIELD

The present invention relates to an inkjet recording ink, a recording ink set, ink records, an ink cartridge, a recording method, and an inkjet recording apparatus.

BACKGROUND ART

Conventionally, for colorants for inkjet recording ink, dyes have been used, however, dye inks have shortcomings in that they are poor in water resistance and weather resistance and easily bleeds on regular paper. To remedy these shortcomings, an ink using a pigment as a colorant is proposed.

For example, Patent Literature 1 proposes a method for alleviating color bleed using a self-dispersible carbon black, however, dyes are used for the color inks for the ink set demonstrated in the publication, and the color ink is inferior in water resistance and weather resistance. In addition, the color inks have a shortcoming in that they are inferior in feathering on regular paper to pigment inks. The method of alleviating color bleed proposed in the publication utilizes a quick separation of solid contents from a solvent, however, it is difficult to prevent color bleed on media which are poor in penetration.

Patent Literature 2 proposes an ink set containing inks having a difference in surface tension between the inks of 5 mN/m to 50 mN/m.

Patent Literature 3 proposes an ink set having a difference in viscosity between the inks of 0.7 mPa·s to 4 mPa·s. However, when there is a large difference in physical properties between inks, it is unfavorable because of difficulty of selecting members for ink nozzle and ink head peripherals and designing systems such as cleaning mechanism. Particularly when the ink viscosity differs between inks, the amount of discharged ink-drop varies at every discharge time, and the dot diameter differs between color inks to make it difficult to perform image processing. Thus, it is preferred that an ink set has smallest possible difference in physical properties between inks.

Patent Literature 4 proposes a method for reducing occurrences of color bleed using water-soluble organic solvents having a difference in solubility parameter of 4 or more between a black ink and color inks. However, with the ink compositions demonstrated in the present invention, namely, when an ink set using an ink using a water-insoluble color material was used to record information on poorly ink-absorbable coated paper, it was impossible to prevent color bleed even when water-soluble organic solvents having a difference in solubility parameter of 4 or more between color inks.

Patent Literature 5 proposes preventing color bleed by defining the initial contact angle of ink with regular paper, the difference in dynamic contact angle, and the rate of dot-dimension change. The initial wet property of ink relative to recording media effects color bleed, however, it is difficult to prevent color bleed by only controlling the wet property of ink relative to recording media.

Further, Patent Literature 6 defines the range of contact angle between a first liquid and a second liquid, however, similarly to Patent Literature 5, it is difficult to prevent color bleed by only controlling the wet property of ink relative to recording media. In addition, since the ink composition used in Patent Literature 6 has a large water content, it easily causes a phenomenon called cockling where the printed medium is deformed like wavy paper.

Accordingly, an ink which excels in image water resistance and image weather resistance and allows excellent image formation without substantially causing color bleed not only on regular paper but also on poorly water-absorbable printing paper has not been realized yet. Here, poorly water-absorbable paper means printing coated paper whose surface is applied with an inorganic pigment such as calcium carbonate and kaolin, and such paper is not generally recognized as paper having inkjet suitability because it has a low rate of ink absorption when printed with a water inkjet ink, and color bleed easily occurs.

Inkjet printing enables easy printing because of no need of plate-making, and water inks have less environmental burdens. For these reasons, it is desired to print images at a quality as high as those seen in commercial printing such as offset printing and gravure printing, using a water inkjet.

Patent Literature 1 Japanese Patent Application Laid-Open (JP-A) No. 2004-352996
Patent Literature 2 Japanese Patent Application Laid-Open (JP-A) No. 2005-154605
Patent Literature 3 Japanese Patent Application Laid-Open (JP-A) No. 2005-154607
Patent Literature 4 Japanese Patent Application Laid-Open (JP-A) No. 2002-275402
Patent Literature 5 Japanese Patent Application Laid-Open (JP-A) No. 2003-321631
Patent Literature 6 Japanese Patent Application Laid-Open (JP-A) No. 2004-338392

DISCLOSURE OF THE INVENTION

The present invention aims to provide a recording ink which is excellent in dry property, discharge stability, and storage stability and allows excellent image formation not only on regular paper but also on poorly water-absorbable printing coated paper whose surface is applied with an inorganic pigment, without substantially causing color bleed, thereby forming excellent printed matter having no paper cockling. The present invention also aims to provide a recording ink set, ink records, an ink cartridge, a recording method, and an inkjet recording apparatus.

When an image is recorded on poorly water-absorbable printing coated paper whose surface is applied with an inorganic pigment, it takes some time to absorb water and a solvent contained in the ink, and thus adjacent droplets easily cause color bleeding. Particularly when a black droplet gravitates toward a color droplet at the boundary portion between the color ink and the black ink, the black ink moves toward the color ink, and the black ink infiltrates into the color ink, and then color bleed occurs on the ink-dry paper. In contrast, when a color droplet gravitates toward a black droplet, the color ink moves toward the black ink, and the color ink infiltrates into the black ink, however, color bleeding is not observed on the ink-dry paper, because the color ink is negated by the black ink, and color bleed becomes less conspicuous.

Immediately after a color droplet makes contact with a black droplet, a fluid separating the two droplets is removed, and the two liquids come to unite each other. At that point in time, it is found that a flow is induced from a liquid having a small surface tension toward a liquid having a large surface tension.

Here, the surface tension of liquid means the surface tensions of different water-soluble organic solvents contained in individual inks, not means the surface tension of the ink itself. The surface tension of ink itself is controlled by the type and the added amount of surfactants and is a parameter primarily affecting the wet property relative to a base material. In other words, the surface tension of ink itself is adjusted to control the wet condition of a recording medium right after the ink is dropped on the recording medium and the wet condition of areas surrounding the ink-discharging nozzle.

Thus, the present inventors found that to control color bleed which is caused between a black ink and color inks, it is effective to use at least one different water-soluble organic solvent between a black ink and at least one of the inks other than the black ink and to make the surface tension of the water-soluble organic solvents used for the inks other than the black ink higher than that of the water-soluble organic solvent used for the black ink.

At the same time, the present inventors also found that when the higher an ink infiltrates into paper right after the dropping of the ink on the paper, i.e. the lower the contact angle between the ink and the paper right after the ink is dropped on the paper, the smaller the contact area between droplets, and thus it is more advantageous in preventing color bleed.

The present invention is based on the findings by the present inventors, and the means for solving the problems are as follows.

<1> A recording ink set containing a black ink, a cyan ink, a magenta ink, and a yellow ink, each of which contains water, a water-insoluble color material, a water-soluble organic solvent, and a surfactant, wherein the black ink and at least one of the inks other than the black ink respectively contain a different water-soluble organic solvent; and the surface tension of the water-soluble organic solvent(s) used only for the inks other than the black ink is higher than that of the water-soluble organic solvent used only for the black ink.

<2> The recording ink set according to the item <1>, wherein the contact angle between the each ink and a recording medium when measured 100 ms after 2 μL of the each ink of the recording ink set is dropped on a recording medium is 15 degrees to 35 degrees, the recording medium is provided with a coating layer on at least one surface of a support and has a transfer amount of pure water to the recording medium measured by the use of a dynamic scanning absorptometer for a contact time of 100 ms is 3 mL/m² to 15 mL/m².

<3> The recording ink set according to any one of the items <1> to <2>, wherein the surface tension of the each ink of the recording ink set at a temperature of 25° C. is 20 mN/m to 40 mN/m.

<4> The recording ink set according to any one of the items <1> to <3>, wherein the viscosity difference between at least one ink of the recording ink set which contains at least the black ink, the cyan ink, the magenta ink, and the yellow ink, and the other inks of the recording ink set is 0 mPa·s to 0.8 mPa·s.

<5> The recording ink set according to any one of the items <1> to <4>, wherein the viscosity of the each ink of the recording ink set at a temperature of 25° C. is 6 mPa·s to 20 mPa·s.

<6> The recording ink set according to any one of the items <1> to <5>, wherein the water content of the each ink is 40% by mass to 60% by mass, and the content of each of the water-soluble organic solvents in the each ink is 15% by mass to 40% by mass.

<7> The recording ink set according to any one of the items <1> to <6>, further containing a penetrant which contains a diol compound having 7 to 11 carbon atoms.

8. The recording ink set according to any one of the items <1> to <7>, wherein the surfactant is a fluorochemical surfactant, and the fluorochemical surfactant is represented by at least one selected from the following structural formulas (I), (II), and (III),

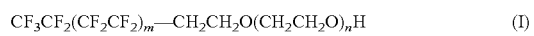

(where "m" is an integer of 0 to 10, and "n" is an integer of 1 to 40),

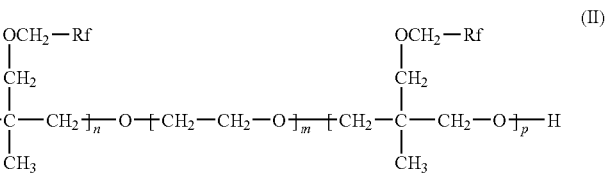

(where "Rf" represents a fluorine-containing group, and "m", "n", and "p" are respectively an integer),

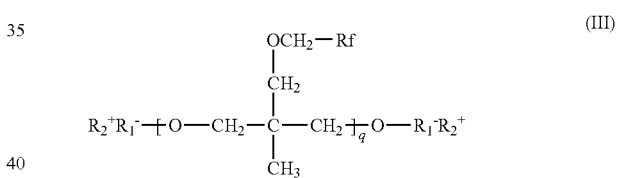

(where "Rf" represents a fluorine-containing group; $R_1$ represents an anionic group; $R_2$ represents a cationic group; and "q" is an integer).

<9> The recording ink set according to any one of the items <1> to <8>, further containing resin fine particles having a volume average particle diameter of 30 nm to 200 nm.

<10> Recording inks containing water, a water-insoluble color material, water-soluble organic solvents, and a surfactant, wherein the recording inks contains a black ink and at least one selected from a cyan ink, a magenta ink, and a yellow ink; the black ink and at least one of the inks other than the black ink respectively contain a different water-soluble organic solvent; and the surface tension of the water-soluble organic solvent(s) used only for the inks other than the black ink is higher than that of the water-soluble organic solvent used only for the black ink.

<11> The recording inks according to the item <10>, wherein the contact angle between the each ink and a recording medium when measured 100 ms after 2 μL of the each ink of the recording ink set is dropped on a recording medium is 15 degrees to 35 degrees, the recording medium is provided with a coating layer on at least one surface of a support and has a transfer amount of pure water to the recording medium measured by the use of a dynamic scanning absorptometer for a contact time of 100 ms is 3 mL/m² to 15 mL/m².

<12> The recording inks according to any one of the items <10> to <11>, wherein the surface tension of the each ink at a temperature of 25° C. is 20 mN/m to 40 mN/m.

<13> The recording inks according to any one of the items <10> to <12>, wherein the viscosity difference between at least one recording ink selected from the black ink, the cyan ink, the magenta ink and the yellow ink, and the recording inks other than the at least one recording ink is 0 mPa·s to 0.8 mPa·s.

<14> The recording inks according to any one of the items <10> to <13>, wherein the viscosity of the each ink at a temperature of 25° C. is 6 mPa·s to 20 mPa·s.

<15> The recording inks according to any one of the items <10> to <14>, wherein the water content of the each ink is 40% by mass to 60% by mass, and the content of each of the water-soluble organic solvents in the each ink is 15% by mass to 40% by mass.

<16> The recording inks according to any one of the items <10> to <15>, further containing a penetrant which contains a diol compound having 7 to 11 carbon atoms.

<17> The recording inks according to any one of the items <10> to <16>, wherein the surfactant is a fluorochemical surfactant, and the fluorochemical surfactant is represented by at least one selected from the following structural formulas (I), (II), and (III), $$CF_3CF_2(CF_2CF_2)_m\text{—}CH_2CH_2O(CH_2CH_2O)_nH \quad (I)$$

(where "m" is an integer of 0 to 10, and "n" is an integer of 1 to 40),

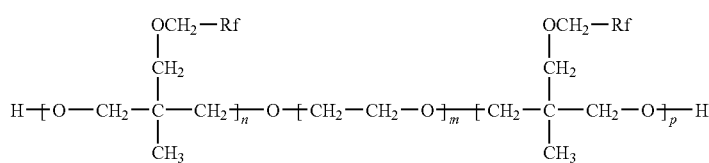

(where "Rf" represents a fluorine-containing group, and "m", "n", and "p" are respectively an integer),

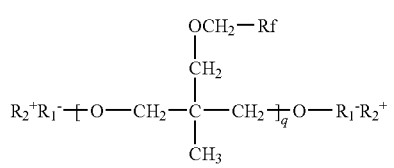

(where "Rf" represents a fluorine-containing group; $R_1$ represents an anionic group; $R_2$ represents a cationic group; and "q" is an integer).

<18> The recording inks according to any one of the items <10> to <17>, further containing resin fine particles having a volume average particle diameter of 30 nm to 200 nm.

<19> A recording method which includes recording information on a recording medium which is provided with a coating layer on at least one surface of a support using a recording ink set according to any one of the items <1> to <9>, wherein the transfer amount of pure water to the recording medium measured by the use of a dynamic scanning absorptometer for a contact time of 100 ms is 3 mL/m² to 15 mL/m².

<20> A recording method including recording an image on a recording medium which is provided with a coating layer on at least one surface of a support using recording inks according to the items <10> to <19>, wherein the transfer amount of pure water to the recording medium measured by the use of a dynamic scanning absorptometer for a contact time of 100 ms is 3 mL/m² to 15 mL/m².

<21> An inkjet recording apparatus including an ink drop discharge unit configured to discharge ink drops to record an image by applying stimulation to each ink of a recording ink set according to any one of the items <1> to <9>.

<22> The inkjet recording apparatus according to the item <21>, wherein the stimulation is at least one selected from heat, pressure, vibration and light.

<23> The inkjet recording apparatus according to any one of the items <21> to <22>, wherein the size of discharged ink droplets is 3 pL to 40 pL; the recording speed is 5 m/s to 20 m/s; the frequency of the applied stimulation is 1 kHz or more; and the resolution is 300 dpi or more.

<24> An inkjet recording apparatus including an ink drop discharge unit configured to discharge ink drops to record an image by applying stimulation to the recording inks according to any one of the items <10> to <19>.

<25> The inkjet recording apparatus according to the item <24>, wherein the stimulation is at least one selected from heat, pressure, vibration and light.

<26> The inkjet recording apparatus according to any one of the items <24> to <25>, wherein the size of discharged ink droplets is 3 pL to 40 pL; the recording speed is 5 m/s to 20 m/s; the frequency of the applied stimulation is 1 kHz or more; and the resolution is 300 dpi or more.

<27> An ink record containing an image recorded on a recording medium using the recording ink set according to one of the items <1> to <9>.

<28> An ink record containing an image recorded on a recording medium using the recording inks according to one of the items <10> to <19>.

<29> An ink cartridge containing a recording ink set according to any one of the items <1> to <9>, wherein the recording ink set is contained in a container.

<30> An ink cartridge containing recording inks according to any one of the items <10> to <19>, wherein the recording inks are contained in a container.

Figure 1:
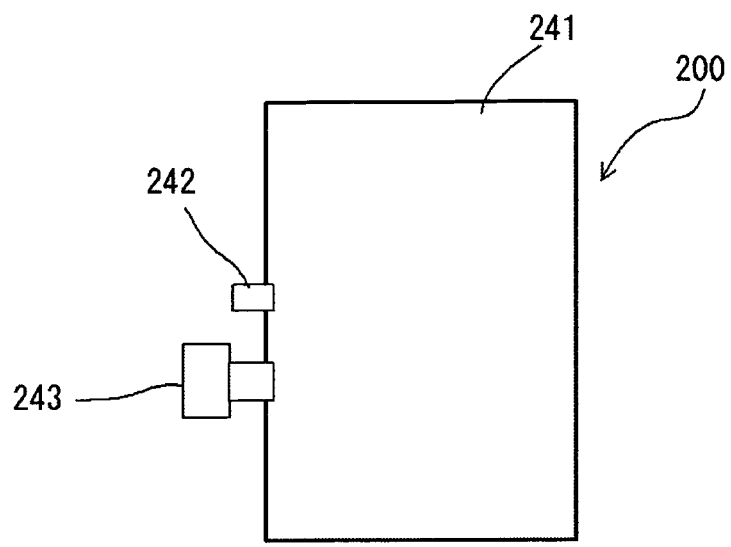
FIG. 1 is a schematic illustration showing an example of an ink cartridge of the present invention.

BEST MODE FOR CARRYING OUT THE INVENTION (Recording Ink)

The recording ink of the present invention contains at least water, a water-insoluble color material, a water-soluble organic solvent, and a surfactant, and the recording inks contains at least a black ink, and one selected from a cyan ink, a magenta ink, and a yellow ink, wherein at least one of the inks other than the black ink contains a different water-soluble organic solvent from that of the black ink, and the surface tension of the water-soluble organic solvent(s) used only for the inks other than the black ink is higher than that of the water-soluble organic solvent used only for the black ink.

(Recording Ink Set)

The recording ink set of the present invention contains at least a black ink, and one selected from a cyan ink, a magenta ink, and a yellow ink, each of which contains at least water, a water-insoluble color material, a water-soluble organic solvent, and a surfactant, wherein at least one of the inks other than the black ink contains a different water-soluble organic solvent from that of the black ink, and the surface tension of the water-soluble organic solvent(s) used only for the inks other than the black ink is higher than that of the water-soluble organic solvent used only for the black ink.

The water-soluble organic solvent is not particularly limited and may be suitably selected in accordance with the necessity. Examples of the water-soluble organic solvent include polyvalent alcohols such as ethylene glycol, diethylene glycol, triethylene glycol, polyethylene glycol, polypropylene glycol, dipropylene glycol, tripropylene glycol, 1,3-propanediol, 1,3-butanediol, 2,3-butanediol, 1,4-butanediol, 3-methyl-1,3-butanediol, 1,5-pentanediol, tetraethylene glycol, 1,6-hexanediol, 3-methyl-1,5-pentanediol, 2-methyl-2,4-pentanediol, polyethylene glycol, glycerol, 1,2,6-hexanetriol, 1,2,4-butanetriol, 1,2,3-butanetriol, and petriol; polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyvalent alcohol aryl ethers such as ethylene glycol monophenyl ether and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam; amides such as formamide, N-methylformamide, formamide, and N,N-dimethylformamide; amines such as monoethanolamine, diethanolamine, triethanolamine, monoethylamine, diethylamine, and triethylamine; sulfur-containing compounds such as dimethylsulfoxide, sulfolane, and thiodiethanol; propylene carbonate, and ethylene carbonate. Each of these solvents can be used along with water individually or in combination with two or more.

Of these water-soluble organic solvents, the following ones are preferably used in terms that excellent effects can be achieved for solubility and for preventing degradation of injection properties caused by water evaporation. The preferred water-soluble organic solvents are glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 3-methyl-1,5-pentanediol, 2-methyl-2,4-pentane diol, 3-methyl-1,5-pentanediol, 2-methyl-2,4-pentanediol, polyethyleneglycol, 1,2,4-butanetriol, 1,2,6-hexanetriol, thiodiglycol, 2-pyrrolidone, N-methyl-2-pyrolidone, and N-hydroxyethyl-2-pyrolidone.

Further, among these water-soluble organic solvents, particularly preferable combinations of inks as an ink set capable of preventing color bleed include the following ones.

A combination of a color ink containing diethylene glycol (surface tension=48.5 mN/m) with a black ink containing 1,4-butanediol (surface tension=45.3 mN/m) or triethylene glycol (surface tension=45.2 mN/m) or 1.5-pentanediol (surface tension=43.2 mN/m) or N-methylpyrrolidone (surface tension=41 mN/m) or 1,3-butanediol (surface tension=37.8 mN/m) or 3-methyl-1,5-pentanediol (surface tension=37.5 mN/m) or propylene glycol (surface tension=36 mN/m) or tripropylene glycol (surface tension=34 mN/m) or 2,3-butanediol (surface tension=33.8 mN/m) or 3-methyl-1,3-butanediol (surface tension=32.8 mN/m) or dipropylene glycol (surface tension=32 mN/m) or 2-methyl-2,4-pentanediol (surface tension=27 mN/m).

A combination of a color ink containing ethylene glycol (surface tension=46.5 mN/m) with a black ink containing 1,4-butanediol (surface tension=45.3 mN/m) or triethylene glycol (surface tension=45.2 mN/m) or 1,5-pentanediol (surface tension=43.2 mN/m) or N-methylpyrrolidone (surface tension=41 mN/m), 1,3-butanediol (surface tension=37.8 mN/m) or 3-methyl-1,5-pentanediol (surface tension=37.5 mN/m) or propylene glycol (surface tension=36 mN/m) or tripropylene glycol (surface tension=34 mN/m) or 2,3-butanediol (surface tension=33.8 mN/m) or 3-methyl-1,3-butanediol (surface tension=32.8 mN/m) or dipropylene glycol (surface tension=32 mN/m) or 2-methyl-2,4-pentanediol (surface tension=27 mN/m).

A combination of a color ink containing 1,4-butanediol with a black ink containing 1,5-pentanediol (surface tension=43.2 mN/m) or N-methylpyrrolidone (surface tension=41 mN/m) or 1,3-butanediol (surface tension=37.8 mN/m) or 3-methyl-1,5-pentanediol (surface tension=37.5 mN/m) or propylene glycol (surface tension=36 mN/m) or tripropylene glycol (surface tension=34 mN/m) or 2,3-butanediol (surface tension=33.8 mN/m) or 3-methyl-1,3-butanediol (surface tension=32.8 mN/m) or dipropylene glycol (surface tension=32 mN/m) or 2-methyl-2,4-pentanediol (surface tension=27 mN/m).

A combination of a color ink containing 1,3-butanediol with a black ink containing 3-methyl-1,5-pentanediol (surface tension=37.5 mN/m) or propylene glycol (surface tension=36 mN/m) or tripropylene glycol (surface tension=34 mN/m) or 2,3-butanediol (surface tension=33.8 mN/m) or 3-methyl-1,3-butanediol (surface tension=32.8 mN/m) or dipropylene glycol (surface tension=32 mN/m) or 2-methyl-2,4-pentanediol (surface tension=27 mN/m).

A combination of a color ink containing triethylene glycol with a black ink containing 1,5-pentanediol (surface tension=43.2 mN/m) or N-methylpyrrolidone (surface tension=41 mN/m) or 1,3-butanediol (surface tension=37.8 mN/m) or 3-methyl-1,5-pentanediol (surface tension=37.5 mN/m) or propylene glycol (surface tension=36 mN/m) or tripropylene glycol (surface tension=34 mN/m) or 2,3-butanediol (surface tension=33.8 mN/m) or 3-methyl-1,3-butanediol (surface tension=32.8 mN/m) or dipropylene glycol (surface tension=32 mN/m) or 2-methyl-2,4-pentanediol (surface tension=27 mN/m).

A combination of a color ink containing 1,5-pentanediol with a black ink containing 1,3-butanediol (surface tension=37.8 mN/m) or 3-methyl-1,5-pentanediol (surface tension=37.5 mN/m) or propylene glycol (surface tension=36 mN/m) or tripropylene glycol (surface tension=34 mN/m) or 2,3-butanediol (surface tension=33.8 mN/m) or 3-methyl-1, 3-butanediol (surface tension=32.8 mN/m) or dipropylene glycol (surface tension=32 mN/m) or 2-methyl-2,4-pentanediol (surface tension=27 mN/m).

A combination of a color ink containing 1,3-butanediol with a black ink containing propylene glycol (surface tension=36 mN/m) or tripropylene glycol (surface tension=34 mN/m) or 2,3-butanediol (surface tension=33.8 mN/m) or 3-methyl-1,3-butanediol (surface tension=32.8 mN/m) or dipropylene glycol (surface tension=32 mN/m) or 2-methyl-2,4-pentanediol (surface tension=27 mN/m).

A combination of a color ink containing propylene glycol with a black ink containing tripropylene glycol (surface tension=34 mN/m) or 2,3-butanediol (surface tension=33.8 mN/m) or 3-methyl-1,3-butanediol (surface tension=32.8 mN/m) or dipropylene glycol (surface tension=32 mN/m) or 2-methyl-2,4-pentanediol (surface tension=27 mN/m).

A combination of a color ink containing tripropylene glycol with a black ink containing 3-methyl-1,3-butanediol (surface tension=32.8 mN/m) or dipropylene glycol (surface tension=32 mN/m) or 2-methyl-2,4-pentanediol (surface tension=27 mN/m).

A combination of a color ink containing 2,3-butanediol with a black ink containing 3-methyl-1,3-butanediol (surface tension=32.8 mN/m) or dipropylene glycol (surface tension=32 mN/m) or 2-methyl-2,4-pentanediol (surface tension=27 mN/m).

A combination of a color ink containing 3-methyl-1,3-butanediol with a black ink containing dipropylene glycol (surface tension=32 mN/m) or 2-methyl-2,4-pentanediol (surface tension=27 mN/m).

Further, a combination of a color ink containing dipropylene glycol with a black ink containing 2-methyl-2,4-pentanediol (surface tension=27 mN/m).

In addition, glycerin serves as a moisturizing agent and can be used in both color ink and black ink.

The content of the water-soluble organic solvent in the recording ink is preferably 15% by mass to 40% by mass, and more preferably 20% by mass to 35% by mass. With an excessively small content of the water-soluble organic solvent, the ink is easily dried in the nozzle, and droplets may not be smoothly discharged. With an excessively large content of the water-soluble organic solvent, the ink viscosity may be increased, and it may exceed the appropriate viscosity limit.

For the surfactant, one selected from anionic surfactants, cationic surfactants, nonionic surfactants, ampholytic surfactants, and fluorochemical surfactants can be used alone, or two or more selected therefrom can be mixed for use.

Examples of the anionic surfactant include alkylallyl, alkylnaphthalenesulfonate, alkylphosphate, alkylsulfate, alkylsulfonate, alkylethersulfate, alkylsulfosuccinate, alkylestersulfate, alkylbenzenesulfonate, alkyldiphenyletherdisulfonate, alkylaryletherphosphate, alkylaryletherosulfate, alkylarylethersterosulfate, olefinsulfonate, alkaneolefinsulfonate, polyoxyethylenealkyletherphosphate, polyoxyethylenealkylethersulfic ester salt, ethercarboxylate, sulfosuccinate, α-sulfo fatty acid ester, fatty acid salt, condensates of higher fatty acid and amino acid, and naphthenate.

Examples of the nonionic surfactant include acetylene glycol surfactants, polyoxyethylenealkylether, polyoxyethylenealkylphenylether, polyoxyethylenealkyl ester, and polyoxyethylene sorbitan fatty acid ester.

Examples of the cationic surfactant include alkyl amine salt, dialkyl amin salt, aliphatic amine salt, benzalkonium salt, quaternary ammonium salt, alkylpyridinium salt, imidazolium salt, sulfonium salt, and phosphonium salt.

Examples of the amphoteric surfactant include imidazoline derivatives such as imidazolium betaine; dimethylalkyllauryl betaine, alkylglycine, alkyldi(aminoethyl)glycine.

For the fluorochemical surfactant, those represented by the following Structural Formula (I) to (III) can be preferably used.

(In the Structural Formula (I), "m" is an integer of 0 to 10, and "n" is an integer of 1 to 40.)

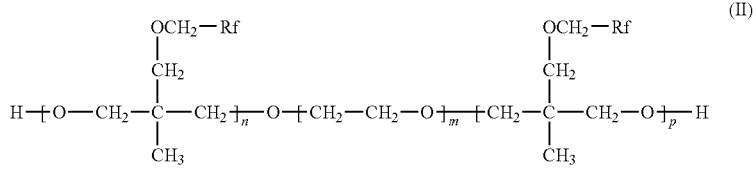

(In the Structural Formula (II), "Rf" represents a fluorine-containing group, and "m", "n" and "p" are respectively an integer.)

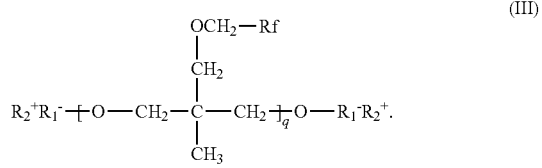

(In the Structural Formula (III), "Rf" represents a fluorine containing group, "$R_1$" represents an anionic group, and "$R_2$" represents a cationic group, and "q" is an integer.)

Examples of commercially available fluorochemical surfactants include Surflon S-111, S-112, S-113, S-121, S-131, S-132, S-141, and S-145 (available from Asahi Glass Co., Ltd.); Fluorad FC-93, FC-95, FC-98, FC-129, FC-135, FC-170C, FC-430, FC-431, and FC4430 (available from Sumitomo 3M Limited); Megafack F-470, F-1405, and F-474 available from Dainippon Ink & Chemicals Inc.); Zonyl FS-300, FSN, FSN-100, and FSO (available from DuPont Kabushiki Kaisha); EFTOP EF-351, EF-352, EF-801, and EF-802 (available from JEMCO Inc).

Nonionic surfactants and fluorochemical surfactants are particularly preferably used.

Examples of the colorant include dyes such as oil-soluble dyes and disperse dyes; and pigments. In the present invention, pigments that excel in water resistance and weather resistance were used.

Examples of the pigments to be used in the present invention include, carbon black as a black pigment; and include color pigments such as anthraquinone, phthalocyanine blue, phthalocyanine green, diazo, monoazo, pyranthron, perylene, heterocyclic yellow, quinacridone, and (thio)indigoid. Examples of typical phthalocyanine blue include copper phthalocyanine blue and derivatives thereof (C.I. Pigment Blue 15). Examples of typical quinacridone include C.I. Pigment Orange 48, C.I. Pigment Orange 49, C.I. Pigment Red 122, C.I. Pigment Red 192, C.I. Pigment Red 202, C.I. Pigment Red 206, C.I. Pigment 206, C.I. Pigment Red 207, C.I. Pigment Red 209, C.I. Pigment Violet 19, and C.I. Pigment Violet 42. Examples of typical anthraquinone include C.I. Pigment Red 43, C.I. Pigment Red 194 (Perylene Red), C.I. Pigment Red 216 (brominated Pyranthron Red) and C.I. Pigment Red 226 (Pyranthron Red). Examples of typical perylene include C.I. Pigment Red 123 (Vermillion), C.I. Pigment Red 149 (scarlet), C.I. Pigment Red 179 (maroon), C.I. Pigment Red 190 (red), C.I. Pigment Violet, C.I. Pigment Red 189 (yellow shade red), and Pigment Red 224. Examples of typical thioindigoid include C.I. Pigment Red 86, C.I. Pigment Red 87, C.I. Pigment Red 88, C.I. Pigment Red 181, C.I. Pigment Red 198, C.I. Pigment Violet 36, and C.I. Pigment Violet 38. Examples of heterocyclic yellow include C.I. Pigment Yellow 117, and C.I. Pigment Yellow 138. Examples of the other appropriate color pigments are described in "The Colour Index, $3^{rd}$ edition (The Society of Dyers and Colourists, 1982)".

Further, in the present invention, it is possible to use a pigment obtained by dispersing it in a water-based medium using a dispersing agent. For the dispersing agent, those known in the art used for conventionally known pigment dispersions can be preferably used.

Examples of preferable dispersion agents include polyacrylic acid, polymethacrylic acid, acrylic acid-acrylonitrile copolymers, vinyl acetate-acrylic acid ester copolymers, acrylic acid-acrylic acid alkylester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene-α-methylstyrene-acrylic acid copolymers, styrene-α-methylstyrene-acrylic acid copolymer-acrylic acid alkyl ester copolymers, styrene-maleic acid copolymers, vinylnaphthalene-maleic acid copolymers, vinylacetate-ethylene copolymers, vinylacetate-fatty acid vinylethylene copolymers, vinylacetate-maleic acid ester copolymers, vinylacetate-crotonic acid copolymers, and vinylacetate-acrylic acid copolymers.

The mass average molecular mass of these copolymers is preferably 3,000 to 50,000, more preferably 5,000 to 30,000, and most preferably 7,000 to 15,000. For the added amount of the dispersing agent, the dispersing agent may be suitably added within such a range that the pigment can be stably dispersed and other effects of the present invention cannot be eliminated. The dispersing agent is preferably added to the pigment at a ratio of 1:0.06 to 1.3, and more preferably added at a ratio of 1:0.125 to 1:3.

For colorants to be used in the present invention, a pigment that at least one hydrophilic group is combined to the surface thereof can be used. As the result, like conventional inks, the pigment can be stably dispersed without using a dispersing agent for dispersing pigments. When such a pigment having a hydrophilic group on the surface thereof and needing no dispersing agent is used, it is possible to provide a highly reliable ink which excels in long-term storage stability, is resoluble to water even when moisture is evaporated, and causes no nozzle clogging due to dried pigment in the nozzle when used in a printer.

For carbon black having at least one hydrophilic group on the surface thereof to be used in the present invention, those having ionicity are preferable, and anionically charged carbon black or cationically charged carbon black is suitably used.

For the carbon black, it is possible to use those produced by a known method for producing a carbon black such as channel method, oil furnace method, furnace method, acetylene black method, and thermal black method.

For a carbon black to be used for a black pigment, such a carbon black is preferable that is produced by furnace method or channel method and has a primary particle diameter of 15 nm to 40 nm, a specific surface area based on the BET method of 50 $m^2/g$ to 300 $m^2/g$, a DBP oil absorption of 40 mL/100 g to 150 mL/100 g, and a pH value of 2 to 9.

For the preferred carbon black, it is possible to use #2700, #2650, #2600, #2450B, #2400B, #2350, #230, #1000, #990, #980, #970, #960, #950, #900, #850, #750B, MCF88, #650B, MA600, MA77, MA7, MA8, MA11, MA100, MA100R, MA100S, MA220, MA230, MA200RB, MA14, #52, #50, #47, #45, #45L, #44, #40, #33, #32, #30, #25, #20, #10, #5, #95, #85, CF9, and #260 (available from Mitsubishi Chemical Corporation); Raven 700, Raven 5750, Raven 5250, Raven 5000, Raven 3500, and Raven 1255 (available from Columbia Company); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (available from Cabot Corp.); Color Black FW1, Color Black FW2, Color Black FW2V, Color Black FW18, Color Black FW200, Color Black FWS150, Color Black FWS160, Color Black FWS170, Printex 35, Printex U, Printex V, Printex 140 U, Printex 140 V, Special Black 6, Special Black 5, Special Black 4A, and Special Black 4 (available from Degsa. Co.); Tokai Black #8500, Tokai Black #8300, Tokai Black #7550, Tokai Black #7400, Tokai Black #7360, Tokai Black #7350, Tokai Black #7270, and Tokai Black #7100 (available from TOKAI CARBON CO., LTD.); Show Black N110, Show Black N220, Show Black N234, Show Black N339, Show Black N330, Show Black N326, Show Black N330T, Show Black MAF; and Show Black N550 (available from Showa Cabot K.K.), however, the carbon black is not limited to those described above.

The carbon black to be used in the present invention is a carbon black having a surface which is subjected to a modification treatment and to which at least one hydrophilic group is directly bound or is bound through another atomic group, and the carbon black can be stably dispersed without using a dispersing agent.

Examples of the method for modifying the surface of a carbon black include a method in which a carbon black is added to an oxidizing agent aqueous solution, for example, an alkali-metal salt such as hypochlorite, chlorite, chlorate, persulfate, perborate, and percarbonate; or an ammonium salt to thereby subject the carbon black to an oxidization treatment; a method of subjecting a carbon black to an oxidizing plasma treatment at low-temperature; and a method of oxidizing a carbon black using ozone.

Examples of the hydrophilic group include —COOM, —SO$_3$M, —PO$_3$HM, —PO$_3$M$_2$, —SO$_2$NH$_2$, and —SO$_2$NHCOR (where M represents a hydrogen atom, an alkali metal, ammonium or organic ammonium; and R represents an alkyl group having 1 to 12 carbon atoms, a phenyl group that can have a substituent group, or a naphthyl group that can have a substituent group). Of these, it is preferable to use a carbon black having a surface to which —COOM or —SO$_3$M is bound. Examples of the alkali metal which is represented by M in the hydrophilic group include lithium, sodium, and potassium. Examples of the organic ammonium include monomethyl ammonium, trimethyl ammonium, monomethanol ammonium, and trimethanol ammonium.

In addition, it is possible to bind N-ethylpyridyl group represented by the following Structural Formula with a carbon black by subjecting the carbon black to a treatment using 3-amino-N-ethylpyridium bromide, and it is also possible to introduce a cationic hydrophilic group into a carbon black by reacting diazonium salt to the carbon black. For the cationic hydrophilic group, a quaternary ammonium group is preferably used, and quaternary ammonium groups described below are more preferably used. A carbon black pigment of which any one of these quaternary ammonium groups is bound to the surface is suitably used as a color material.

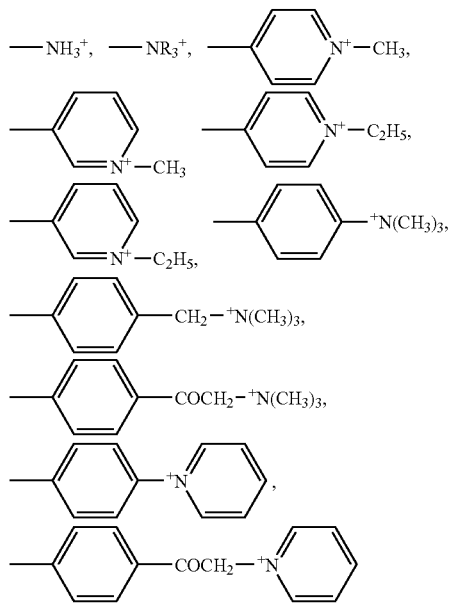

The added amount of pigment as colorant is preferably 4% by mass to 15% by mass, and more preferably 5% by mass to 12% by mass. When the added amount is more than 12% by mass, it easily adversely affect the fixing ability, discharging stability, and reliabilities of clogging prevention, and the like. When the added amount is less than 3% by mass, a sufficient image density may not be obtained.

To the ink of the present invention, resin fine particles can be added. The resin fine particles are fine particles in which a water-insoluble resin is dispersed in water, and have an effect that when the solvent is evaporated, resin fine particles are fused to each other to form a film then to make a colorant fixed on a medium. Further, when the solvent is evaporated, resin fine particles come to have a property of thickening and flocculating each other to prevent infiltration of colorant components to recording media, thereby obtaining a high-image density. An effect of preventing occurrences of strike-through can also be obtained.

Examples of the resin components include acrylic resins, vinyl acetate resins, styrene-butadiene resins, vinylchloride resins, acryl-styrene resins, acrylic silicone resins, butadiene resins, styrene resins, urethane resins, and acrylic urethane resins. For the added amount of the resin emulsion, it is preferably adjusted to a content of 0.1% by mass to 40% by mass relative to the ink content, and more preferably adjusted to a content of 1% by mass to 25% by mass relative to the ink content. When the content of resin fine particles is less than 0.1% by mass, a sufficient fixing ability may not be obtained, and when the content thereof is more than 40% by mass, there may be cases where the storage stability may be degraded because of the composition with high solids content and less solvent; and the discharging stability may be degraded because the resin fine particles are easily dried and solidified in the nozzle.

The resin fine particles preferably have a particle diameter of 30 nm to 200 nm.

In the present invention, a diol compound having 7 to 11 carbon atoms can be used as a penetrant. When the number of carbon atoms is less than 7, the diol compound cannot be sufficiently infiltrated into a recording medium, the recording medium is contaminated at the time of duplex printing, and the pixel density is scarce due to insufficient ink-widening on a recording medium, which may degrade font character quality and image density. When the number of carbon atoms is more than 11, the storage stability may be degraded.

Preferred examples of the diol compound include 2-ethyl-1,3-hexanediol, and 2,2,4-trimethyl-1,3-pentanediol.

The added amount of the diol compound is preferably 0.1% by mass to 20% by mass, and more preferably 0.5% by mass to 10% by mass. When the added amount of the diol compound is excessively small, the infiltration property of the ink relative to paper may be degraded, resulting in contamination of the paper when the paper is conveyed and rubbed with a roller, and/or it may make the ink adhere on a conveying belt, resulting in contamination of a recording medium when the recorded surface of the recording medium is flipped for printing both sides of the recording medium. Therefore, it may not be able to effectively achieve high-speed printing and duplex printing. When the added amount of the diol compound is excessively large, the printing dot diameter may be increased to broaden the character line width and/or to degrade the image sharpness.

In the present invention, an aminopropanediol compound can be added to materials of the recording ink. An aminopropanediol compound is a water-soluble base compound and can keep an ink alkaline pH thereby preventing the ink from eating away members which make contact with the ink for a long term and can also control flocculation of colorants caused by moisture evaporation, thereby maintaining stable ink discharging property.

Aminopropanediol derivatives are not particularly limited, may be suitably selected in accordance with the intended use, and examples thereof include 1-amino-2,3-propanediol, 1-methylamino-2,3-propanediol, 2-amino-2-methyl-1,3-propanediol, and 2-amino-2-ethyl-1,3-propanediol. Of these, 2-amino-2-ethyl-1,3-propanediol is particularly preferable.

The added amount of the aminopropanediol compound in the recording ink is preferably 0.01% by mass to 10% by mass, more preferably 0.1% by mass to 5.0% by mass, and still more preferably 0.1% by mass to 2.0% by mass. When the added amount of the aminopropanediol compound is excessively large, it may cause disadvantages that the pH value of the recording ink is increased to increase the viscosity of the recording ink.

The other components are not particularly limited, may be suitably selected in accordance with the necessity, and examples thereof include a pH adjustor, an antiseptic and mildewproofing agent, an anti-corrosive agent, an antioxidant, an ultraviolet absorber, an oxygen absorbent, and a light stabilizer.

Examples of the antiseptic and mildewproofing agent include 1,2-benzisothiazoline-3-on, sodium dehydroacetate, sodium sorbate, 2-pyridinethiol-1-oxide sodium, sodium benzoate, and pentachlorophenol sodium.

The pH adjustor is not particularly limited, and an arbitrarily selected material can be used, provided that it allows adjusting the pH to 7 or more without adversely affecting the compounded ink.

Examples of the pH adjustor include amines such as diethanolamine, and triethanolamine; hydroxides of alkali-metal elements such as lithium hydroxide, sodium hydroxide, and potassium hydroxide; ammonium hydroxide; quaternary ammonium hydroxide; quaternary phosphonium hydroxide; and alkali-metal carbonates such as lithium carbonate, sodium carbonate, and potassium carbonate.

Examples of the anti-corrosive agent include acidic sulphite salt, sodium thiosulfate, ammonium thiodiglycolate, diisopropylammonium nitrite, pentaerythritol tetranitrate, and dicyclohexylammonium nitrite.

Examples of the antioxidant include phenol antioxidant agents (including hindered phenol antioxidants), amine antioxidants, sulfur antioxidants, and phosphorous antioxidants.

Examples of the phenol antioxidant (including hindered phenol antioxidants) include butylated hydroxyanisol, 2,6-di-tert-butyl-4-ethylphenol, stearyl-β-(3,5-di-tert-butyl-4-hydroxyphenyl) propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propionyloxy]ethyl]2,4,8,10-tetraixaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tetrakis[methylene-3-(3',5'-di-tert-butyl-4'-hydroxyphenyl) propionate]methane.

The amine antioxidant include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisol, 2,2'-methylenebis(4-methyl-6-tert-butylphenol), 4,4'-butylidenebis(3-methyl-6-tert-butylphenol), 4,4'-thiobis (3-methyl-6-tert-butylphenol), tetrakis[methylene-3(3,5-di-tert-butyl-4-dihydroxyphenyl) propionate]methane, and 1,1,3-tris(2-methyl-4-hydroxy-5-tert-butylphenyl)butane.

Examples of the sulfur antioxidant include dilauryl 3,3'-thiodipropyonate, distearylthiodipropyonate, laurylstearylthiodipropyonate, dimyristyl 3,3'-thiodipropyonate, distearyl β,β'-thiodipropyonate, 2-mercaptobenzoimidazol, and dilauryl sulfide.

Examples of the phosphorous antioxidant include triphenylphosphite, octadecylphosphite, triisodecylphosphite, trilauryltrithiophosphite, and trinonylphenylphosphite.

Examples of the ultraviolet absorber include benzophenone ultraviolet absorbers, benzotriazole ultraviolet absorbers, salicylate ultraviolet absorbers, cyanoacrylate ultraviolet absorbers, and nickel complex salt ultraviolet absorbers.

Examples of the benzophenone ultraviolet absorbers include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Examples of the benzotriazole ultraviolet absorber include 2-(2'-hydroxy-5'-tert-octylphenyl)benzotriazole, 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of the salicylate ultraviolet absorber include phenylsalicylate, p-tert-butylphenylsalicylate, and p-octylphenylsalicylate.

Examples of the cyanoacrylate ultraviolet absorber include ethyl-2-cyano-3,3'-diphenylacrylate, methyl-2-cyano-3-methyl-3-(p-methoxyphenyl)acrylate, butyl-2-cyano-3-methyl-3-(p-methoxyphenyl)acrylate.

Examples of the nickel complex salt ultraviolet absorber include nickelbis(octylphenyl)sulfide, 2,2'-thiobis(4-tert-octylphenolate)-n-butylamineNickel (II), 2,2'-thiobis(4-tert-octylphenolate)-2-ethylhexylamineNickel (II), and 2,2'-thiobis(4-tert-octylphenolate)triethanolamineNickel (II).

The recording ink of the present invention can be produced by dispersing or dissolving at least water, a colorant, a water-soluble organic solvent, and a surfactant in a water-based medium, and further dispersing or dissolving a penetrant, resin fine particles, a pH adjustor, and other components in the water-based medium in accordance with the necessary, and stirring and mixing the components in accordance with the necessity. The components can be dispersed using, for example, a sand mill, a homogenizer, a ball mill, a paint shaker, or a ultrasonic dispersion device, and the components can be usually stirred and mixed by the use of a stirrer having stirring blades, a magnetic stirrer, or a high-speed dispersion device.

In the recording ink set of the present invention, to prevent color bleed which will be caused between a black ink and a color ink on poorly water-absorbable coated paper, it is effective to use at least one different water-soluble organic solvent between a black ink and color inks other than the black ink and to make the surface tension of the water-soluble organic solvents used for color inks other than the black ink higher than that of the water-soluble organic solvent used for the black ink. Here, poorly water-absorbable coated paper represents printing coated paper containing a coating layer on at least one surface of a support, in which the transfer amount of pure water to the recording medium measured by the use of a dynamic scanning absorptometer for a contact time of 100 ms is 3 mL/m$^2$ to 15 mL/m$^2$.

In the recording ink and the recording ink set of the present invention, the contact angle between the ink and a recording medium right after the ink is dropped on the recording medium depends on the surface tension of the ink, and the surface tension of the ink at a temperature of 25° C. is preferably adjusted to 20 mN/m to 40 mN/m, and more preferably adjusted to 23 mN/m to 36 mN/m. When the surface tension of the ink is lower than 20 mN/m, the wetting of the ink to the ink discharge nozzle surface is increased, and ink droplets easily adhere on the nozzle head, and therefore ink droplets may not be stably discharged. When the surface tension of the ink is higher than 40 mN/m, the wetting of the ink to the recording medium is insufficient, which may cause color bleeding.

The contact angle between the recording ink and a recording medium right after the ink is dropped on poorly water-absorbable coated paper, here, the contact angle of the each ink when measured 100 ms after 2 μL of the each ink is dropped on a recording medium is preferably 15 degrees to 35 degrees, when the recording medium is provided with a coating layer on at least one surface of a support and has a transfer amount of pure water to the recording medium measured by the use of a dynamic scanning absorptometer for a contact time of 100 ms is 3 mL/m$^2$ to 15 mL/m$^2$. When the contact angle is smaller than 15 degrees, color bleed easily occurs, and when the contact angle is larger than 35 degrees, there is a tendency that color bleed easily occurs and drying property of the ink degrades.

Liquid absorption property can be measured by using a dynamic scanning absorptometer (DSA) available from KYOWA SEIKO K.K.

A dynamic scanning absorptometer ((DSA) pp. 88-92, Vol. 48 Japan Paper and Pulp Technology Journal issued in May 1994) is a device that can accurately measure an absorption amount in a small amount of time. A dynamic scanning absorptometer (DSA) is automated measuring device by a method in which it directly reads the rate of liquid absorption from movement of a meniscus in a capillary and spirally scans a disc-shaped test sample using a liquid absorption head, and automatically change the scanning speed according to a previously set pattern, thereby measuring liquid absorption on necessary points in one paper sheet sample. The liquid supplying head which supplies a liquid to a paper sheet sample is connected the capillary through a TEFLON tube, and the position of the meniscus in the capillary is automatically read by an optical sensor.

The support is not particularly limited, may be suitably selected in accordance with the intended use, and examples thereof include sheet-like materials like paper mainly made of wood-fiber, or nonwoven fabric mainly made of wood-fiber and synthetic fiber.

The paper is not particularly limited and may be suitably selected from among those known in the art in accordance with the intended use. For example, wood pulp, waste paper or the like is used. Examples of the wood pulp include NBKP, LBKP, NBSP, LBSP, GP, and TMP.

As an internal filler used in the support, for example, a pigment known as a white pigment is used. Examples of the internal filler include white inorganic pigments such as light calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithopone, zeolite, magnesium carbonate, and magnesium hydroxide; and organic pigments such as styrene plastic pigment, acrylic plastic pigment, polyethylene, microcapsule, urea resin, and melamine resin. Each of these white pigments may be used alone or in combination with two or more. Examples of the internal sizing agent to be used in papermaking the support include neutral rosin sizing agents, alkenyl succinic anhydrides (ASA), alkylketenedimer (AKD), and petroleum resin sizing agents. Of these, neutral rosin sizing agents or alkenyl succinic anhydride is particularly preferable. It requires less addition amount of the alkylketenedimer because of its high-sizing effect, however, it may be unfavorably used from the perspective of conveyance property of recording medium during the time of inkjet recording because the use of alkylketenedimer easily makes the friction coefficient of the recording medium surface reduced and slippery.

The coated layer contains a pigment and a binder and further contains a surfactant and other components in accordance with the necessity. For the pigment used in the coated layer, an organic pigment or a combination of an inorganic pigment with an organic pigment is used. Examples of the inorganic pigment include pigments made from kaolin, talc, heavy calcium carbonate, light calcium carbonate, calcium sulfite, amorphous silica, white titanium, magnesium carbonate, titanium dioxide, aluminum hydroxide, calcium hydroxide, magnesium hydroxide, zinc hydroxide, and chloride. Kaolin is preferably used because it is excellent in glossiness and can make sheet paper have a texture close to offset printing sheet paper. There are delaminated kaolin, sintered kaolin, engineered kaolin which are respectively subjected to a surface modification treatment or the like, however, in view of the glossiness, it is desired that kaolin having a particle diameter distribution of which particles having a particle diameter of 2 μm or less are contained 80% by mass or more account for 50% by mass or more of the total kaolin content.

The blending amount of kaolin is preferably 50 parts by mass or more. When the blending amount is less than 50 parts by mass, a sufficient glossiness effect is hardly expected. The upper blending amount of kaolin is not particularly limited, however, it is preferably 90 parts by mass or less from the perspective of coating suitability, in consideration of the flowability of kaolin and in particular, thickening property of kaolin under high-shearing force.

In contrast, examples of the organic pigment include water-soluble dispersions such as styrene-acryl copolymer particles, styrene-butadiene copolymer particles, polystyrene particles, polyethylene particles. Two or more of these organic pigments may be used and mixed as internal fillers in the support. The blending amount of the organic pigment is typically 2 parts by mass to 20 parts by mass. Since organic pigments are excellent in glossiness and have a lower specific gravity than those of inorganic pigments, the use of an organic pigment makes it possible to obtain a coating layer which is bulky, highly glossy, and excellent in surface coating property. When the blending amount of the organic pigment is less than 2 parts by mass, the effects cannot be sufficiently exhibited, and when the blending amount is more than 20 parts by mass, the flowability of the coating solution is degraded, which leads to degraded coating operation and costly production cost. Organic pigment particles are typically formed in a densely filled shape, a hollow shape, a doughnut shape, etc., however, the average particle diameter is preferably ranging from 0.2 μm to 3.0 μm in view of the balance of glossiness, surface coating property, and flowability of the coating solution, and it is more preferably that organic pigment particles formed in a hollow shape having a porosity of 40% or more be employed.

For the binder, a water-based resin is preferably used.

For the water-based resin, at least any one of a water-soluble resin or a water-dispersible resin is preferably used. The water-soluble resin is not particularly limited, may be suitably selected in accordance with the intended use, and examples thereof include polyvinyl alcohol, modified polyvinyl alcohols such as anion-modified polyvinyl alcohol, cation-modified polyvinyl alcohol, acetal-modified polyvinyl alcohol; polyurethane; polyvinylpyrolidone, modified polyvinylpyrolidones such as polyvinylpyrolidone-vinyl acetate copolymers, vinylpyrolidone-dimethylaminoethyl-methacrylate copolymers, quaternized vinylpyrolidone-dimethylaminoethyl-methacrylate copolymers, and vinylpyrolidone-methacrylamidepropyl trimythylammonium chloride copolymers; celluloses such as carboxymethylcellulose, hydroxyethylcellulose, and hydroxypropylcellulose; modified cellulose such as cationized hydroxyethyl cellulose; polyester, polyacrylic acid (esters), melamine resins, or modified products thereof; synthetic resins such as polyester-polyurethane copolymers; poly(meth)acrylic acids, poly(meth)acrylamides, oxidized starch, phosphoesterified starch, self-modified starch, cationized starch, or various modified starches; polyethylene oxide, polyacrylate soda, and soda alginate. Each of these water-soluble resins may be used alone or in combination with two or more.

Of these water-based resins, from the perspective of absorption property of ink, polyvinyl alcohol, cation-modified polyvinyl alcohol, acetal-modified polyvinyl alcohol, polyester, polyurethane, and polyester-polyurethane copolymers are particularly preferable. The method for forming the coating layer is not particularly limited, may be suitably selected in accordance with the intended use, and the coating layer can be formed by a method in which a support is impregnated with a coating layer solution or a coating layer solution is applied to a support surface. The method of the impregnating the support surface with a coating layer solution or the method of applying a coating solution to the support surface is not particularly limited, may be suitably selected in accordance with the intended use. For example, the support surface can be coated with the coating layer solution using one of various coaters such as conventional size presses, gate roll size presses, film transfer size presses, blade coaters, rod coaters, air-knife coaters, and curtain coaters, however, from the viewpoint of cost performance, the support may be impregnated in the coating layer solution or may be applied with the coating layer solution using a conventional size press, gate roll size press, or a film transfer size press set in a paper machine and then surfaced on the machine.

Examples of commercially available coating solution to be used for the coating layer solution include OK Topcoat, OK Astro-Gloss, OK Non-wrinkle, SA Kinfuji+, OK Kinfuji+, OK Non-wrinkle, (F) MCOP, OK Astro-dull, OK Astro-matt, OK Ultra-aquasatin, OK Emboss-matt, OK Emboss-pearskin finish, OK Emboss-grain, OK Emboss-homespun, OK Opt-gloss, OK Kasao, OK Casablanca, OK Casablanca-V, OK Casablanca-X, OK Kinfuji single-side, OK Coat L, OK Coat L Green 100, OK Coat N Green 100, OK Coat V, OK medium-quality coat (for offset), OK Topcoat S, OK Topcoat dull, OK Topcoat matt N, OK Trinity, OK Trinity NaVi, OK Trinity NaVi-V, OK Neo Topcoat, OK Neo Topcoat-matt, OK Non-wrinkle AL, OK Non-wrinkle DL, OK Non-wrinkle BL, OK White L, OK Matt Coat L Green 100, OK Matt Coat Green 100, OK Royal Coat, OK White L, Z Coat, Z Coat Green 100, Ultra-satin Kifuji N, Golden Matt, Satin Kinfuji N, New Age, New Age Green 100, Mirror Coat-Gold, Mirror Coat-Platinum, Royal Coat L, LOSTON color, POD Super Gloss, POD Gloss Coat, and POD Matt Coat (available from OJI Paper Co.); Brode Matt A, Brode Gloss A, White Pearl Coat N, New V Matt, Pearl Coat, Dignity, Vista Gloss, N Pearl Coat L, Utrillo, EP-D Gloss, EP-L Gloss, EP-L Matt, EP-D Premium White, and EP-Super High-quality (available from Mitsubishi Paper Mills Ltd.); and Hi-α, α-Matt, Kinmari Hi-L, Mew Coat, Mew Matt, and Mew White (available from Hokuetsu Paper Mills Ltd.).

The recording ink and the recording ink set of the present invention can be preferably used in various areas and can be preferably used in an image recording apparatus (printers, etc.) based on an inkjet recording method. For example, before or after printing, recording subject paper and the recording ink can be heated at 50° C. to 200° C. for use in a printer having a function to accelerate fixing of the printing ink. The recording ink of the present invention can be particularly preferably used in the ink cartridge, ink record, inkjet recording apparatus, and inkjet recording method, which will be described below.

—Ink Cartridge—

The ink cartridge suitably used in the present invention contains a container containing the recording ink of the present invention and other suitably selected members in accordance with the necessity.

The container is not particularly limited and its shape, structure, size, and material can be suitably selected in accordance with the intended use. Preferred examples thereof include those having at least an ink pouch formed by aluminum laminated film or resin film.

Figure 2:
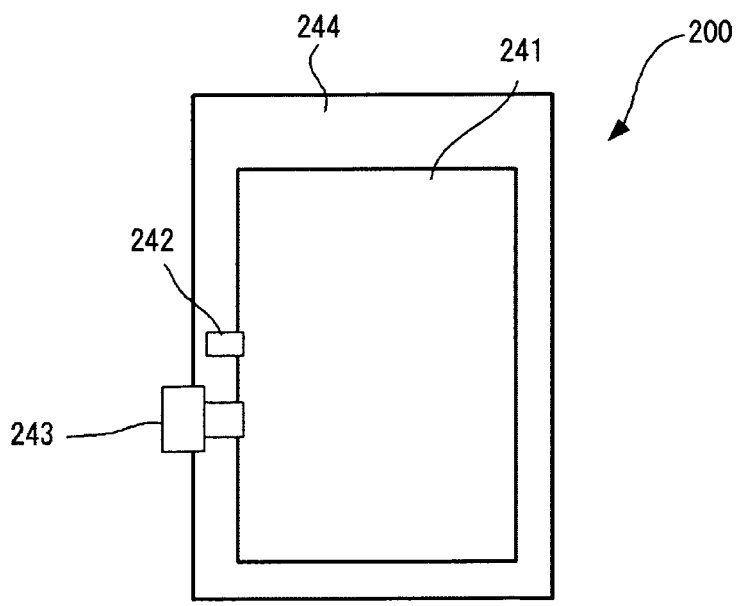
FIG. 2 is a schematic illustration showing the ink cartridge shown in FIG. 1 including a case (exterior).

Hereinafter, the ink cartridge will be described with reference to FIGS. 1 and 2. FIG. 1 is an illustration showing an example of the ink cartridge suitably used in the present invention. FIG. 2 is an illustration of the ink cartridge of FIG. 1 including a case (exterior).

In an ink cartridge 200, as shown in FIG. 1, an ink pouch 241 is filled with an ink through an ink inlet 242. The ink inlet 242 is closed by fusion bonding after the air is exhausted. An ink outlet 243 made of a rubber material is pierced by a needle on the apparatus body for use, thereby the ink is supplied to the apparatus.

The ink pouch 241 is formed by a packaging member such as a non-permeable aluminum laminated film. The ink pouch 241 is housed in a cartridge case 244 generally made of plastics as shown in FIG. 2 and detachably mounted on various types of inkjet recording apparatus.

The ink cartridge of the present invention contains the recording ink (ink set) of the present invention. The ink cartridge can be detachably mounted on variety types of inkjet recording apparatus, and it is particularly preferable that the ink cartridge of the present invention be detachably mounted on the inkjet recording apparatus described later.

—Inkjet Recording Apparatus and Inkjet Recording Method—

The inkjet recording apparatus suitably used in the present invention is provided with at least an ink drop discharging unit and is further provided with other appropriately selected units as required such as an impulse generation unit and a control unit.

The inkjet recording method of the present invention includes at least an ink drop discharging step and further includes other appropriately selected steps as required such as an impulse generation step, and a control step.

The inkjet recording method of the present invention can be preferably performed by means of the inkjet recording apparatus, and the ink drop discharging step can be preferably performed by means of the ink drop discharging unit. The other steps can be preferably performed by means of the other units.

—Ink Drop Discharging Step and Ink Drop Discharging Unit—

The ink drop discharging step is a step in which an impulse is applied on the recording ink of the present invention to discharge recording ink drops to thereby record an image.

The ink drop discharging unit is a unit configured to discharge ink drops to record an image by applying an impulse to the recording ink of the present invention. The ink drop discharging unit is not particularly limited, and examples thereof include various types of nozzle for discharging an ink.

In the present invention, it is preferable that at least part of a liquid chamber, a fluid dragging part, a diaphragm, and nozzle member be made of a material containing at least any one of silicon and nickel.

The nozzle diameter of the inkjet nozzle is preferably 30 μm or less, and more preferably 1 μm to 20 μm.

It is preferable that subtanks for supplying ink be provided on the inkjet head and the ink be supplied to the subtanks from the ink cartridge via supply tubes.

The impulse may be generated by using, for example, the impulse generating unit, and the impulse is not particularly limited, may be suitably selected in accordance with the intended use, and examples thereof include heat (temperature), pressure, vibration, and light. Each of these may be used alone or in combination with two or more. Of these, heat, and pressure are preferable.

The impulse generation unit may be, for example, a heating apparatus, a pressurizing apparatus, a piezoelectric element, a vibration generation apparatus, an ultrasonic oscillator, or a light. Specifically, examples of the impulse generation unit include a piezoelectric actuator such as a piezoelectric element, a thermal actuator using an electrothermal conversion element such as an exothermic resistor to cause film boiling and, accordingly, phase change of a liquid, a shape-memory alloy actuator using metal phase changes due to temperature changes, an electrostatic actuator using electrostatic force.

The aspect of the ink drop discharging is not particularly limited and varies depending on the type of the impulse. For example, when the impulse is "heat," thermal energy corresponding to recording signals is applied to the recording ink in the recording head, for example, using a thermal head, the thermal energy causes the ink to bubble, and the bubble pressure urges the ink to be discharged as ink droplets from the nozzle hole of the recording head. When the impulse is "pressure," for example, an electric voltage is applied to a piezoelectric element bonded at a position called a pressure chamber within the ink passage of the recording head, the piezoelectric element is bent and the pressure chamber is reduced in volume, thereby the ink is discharged as droplets from the nozzle hole of the recording head.

The discharged ink droplets preferably have a particle size of 3 pl to 4 pl. The discharge jet speed is preferably 5 m/sec to 20 m/sec; the driving frequency is preferably 1 kHz or more; and the resolution is preferably 300 dpi or more.

An embodiment of the inkjet recording method of the present invention using the inkjet recording apparatus will be described hereinafter, with reference to the drawings. An inkjet recording apparatus shown in FIG. 3 contains an apparatus body 101, a feeder tray 102 attached to the apparatus body 101 for feeding papers, paper output tray 103 attached to the apparatus body 101 for receiving papers on which images are recorded (formed), and an ink cartridge mounting part 104. An operation part 105 having operation keys and indicators is provided on the top surface of the ink cartridge mounting part 104. The ink cartridge mounting part 104 has a front cover 115 that can be opened and/or closed to remove and/or place ink cartridges 201.

Figure 4:
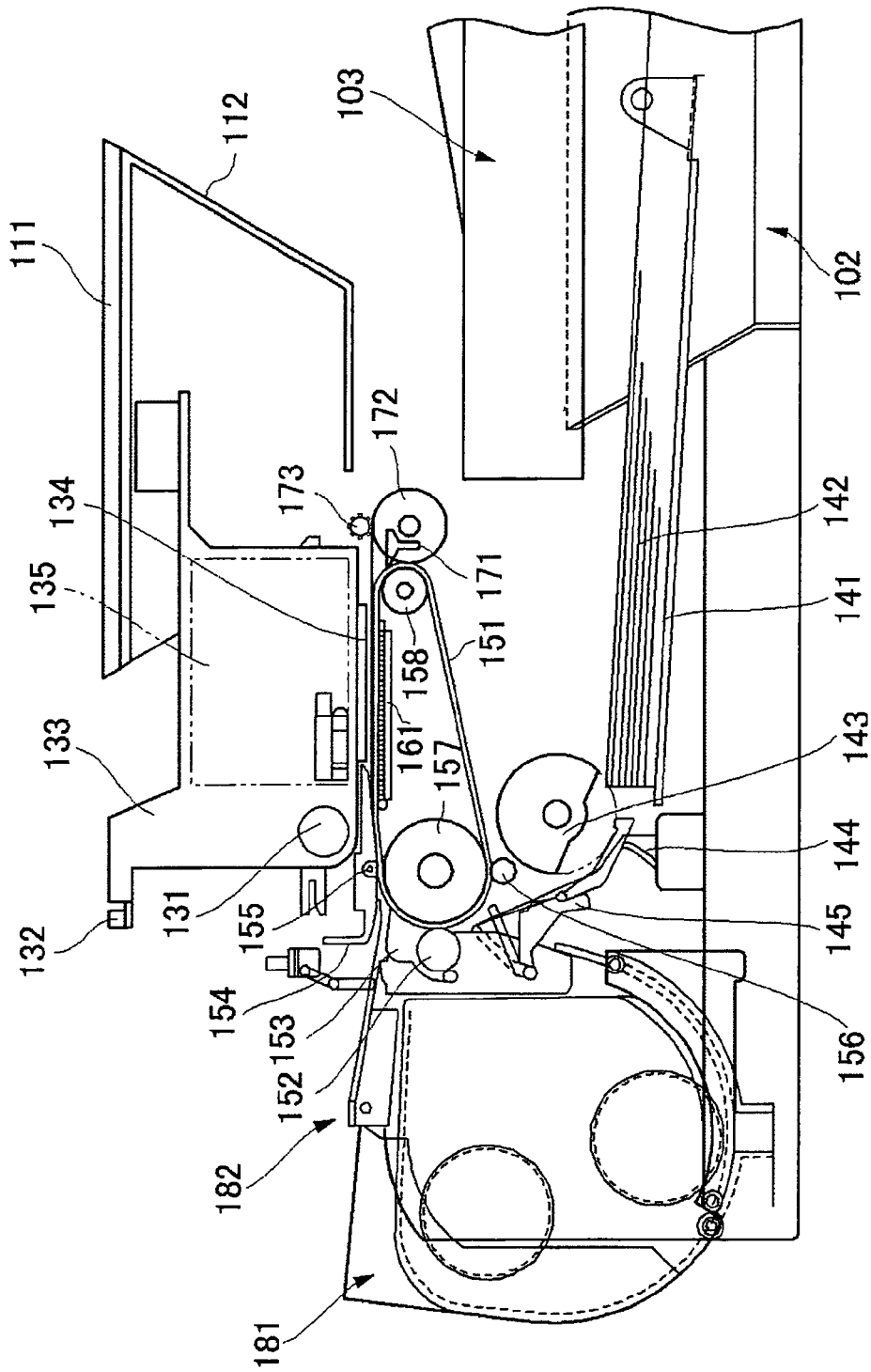
FIG. 4 is a schematic illustration exemplarily explaining the entire structure of an inkjet recording apparatus.
Figure 5:
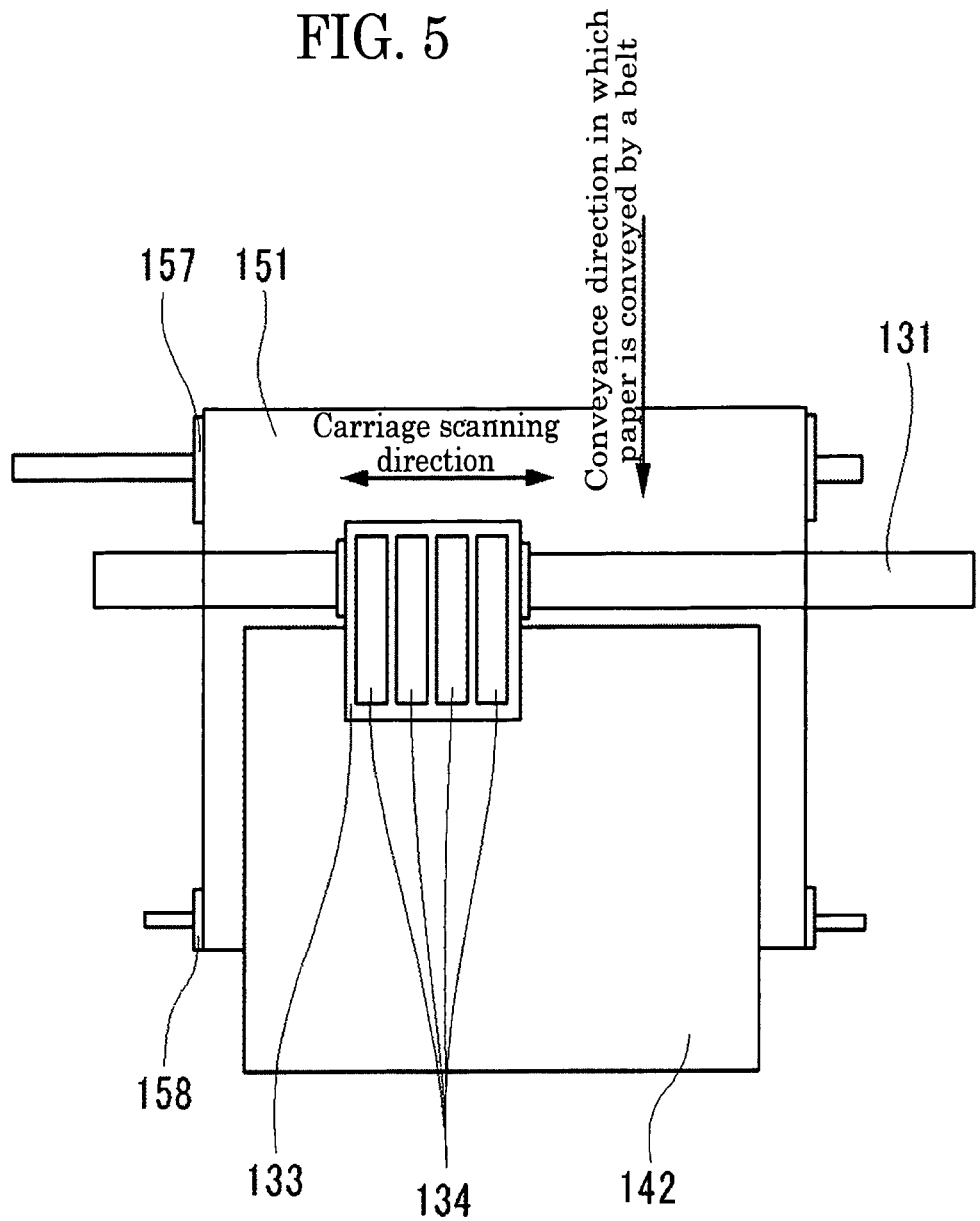
FIG. 5 is a schematic enlarged view showing an example of an inkjet head suitably used in the present invention.

As shown in FIGS. 4 and 5, a carriage 133 is supported slidably in the scan direction by a guide rod 131 that is a guide member laid across right and left side plates which are omitted in the figures and a stay 132 and moved by a main scan-motor (not shown) in the arrowed directions in FIG. 5 for scanning within the apparatus body 101.

Recording heads 134 consisting of four inkjet recording heads that discharge yellow (Y), cyan (C), magenta (M), and black (B) recording ink droplets, respectively, have ink discharge ports arranged in the intersecting direction with the main scanning direction and they are placed with their ink discharge direction downward.

Inkjet recording heads constituting the recording heads 134 are provided with an energy generation unit for discharging recording ink such as a piezoelectric actuator such as an piezoelectric element, a thermal actuator using an electrothermal conversion element such as an exothermic resistor to cause film boiling and, accordingly, phase change of a liquid, a shape-memory alloy actuator using metal phase changes due to temperature changes, and an electrostatic actuator using electrostatic force.

The carriage 133 is provided with subtanks 135 for supplying each ink to the recording heads 134. The subtanks 135 are filled with the recording ink of the present invention from the ink cartridge 200 mounted in the ink cartridge mounting part 104 via a not-shown recording ink supply tube.

In the meanwhile, a paper feed part for feeding paper 142 stuck on a paper load part (platen) 141 of the feed tray 102 is provided with a half-moon roller (a feed roller 143) that separates and supplies the paper 142 from the paper load part 141 one by one and a separation pad 144 that faces the feed roller 143 and is made of a large friction coefficient material. The separation pad 144 is biased toward the feed roller 143.

A conveying part for conveying the paper 142 supplied from the feed part underneath the recording heads 134 is provided with a conveying belt 151 for electrostatically adsorbing and conveying the paper 142, a counter roller 152 for conveying the paper 142 sent from the paper feed part via a guide 145 by clamping it together with the conveying belts 151, a conveying guide 153 for turning the paper 142 sent nearly vertically by 90° so as to lay it on the conveying belt 151, and a leading end pressure roller 155 that is biased toward the conveying belt 151 by a presser member 154. A charging roller 156 that is a charging unit for charging the surface of the conveying belt 151 is also provided.

The conveying belt 151 is an endless belt, being spanned over conveying roller 157 and a tension roller 158 and running around in the belt conveying direction. For example, the conveying belt 151 has a front layer that is a paper adsorbing surface made of a dragging-uncontrolled resin, for example a copolymer of tertafluoroethylene and ethylene (ETFE), having a thickness of around 40 μm and a back layer (an intermediate dragging layer or an earth layer) made of the same material as the front layer, but dragging-controlled with carbon. A guide member 161 is provided behind the conveying belt 151 at the corresponding position to the printing area by the recording heads 134. An output part for discharging the paper 142 on which recording was done by the recording heads 134 is provided with a separation click 171 for separating the paper 142 from the conveying belt 151, a paper output roller 172, and an paper output roller 173. Paper output tray 103 is disposed below paper output roller 172.

A double-side feed unit 181 is detachably mounted in the back of the apparatus body 101. The double-side feed unit 181 takes in the paper 142 that is moved backward as the conveying belt 151 is rotated in the reverse direction, turns it over, and feeds it again between the counter roller 152 and the conveying belt 151. A manual feeder 182 is provided on the top surface of the double-side feed unit 181.

By receiving a recording end signal or a signal indicating that the rear end of the paper 142 has reached the recording area, the recording operation is terminated and the paper 142 is discharged to the paper output tray 103.

When it is detected that the remaining amount of the recording ink in the subtank 135 is nearly to the end, a certain amount of recording ink is supplied to the subtank 135 from the ink cartridge 200.

In this inkjet recording apparatus, when the recording ink in the ink cartridge 200 is used up, the case of the ink cartridge 200 is disassembled and only the ink pouch contained therein can be exchanged. The ink cartridge 200 allows for stable recording ink supply even in a vertical and front mounting structure. Therefore, when the apparatus body 101 is installed with the top being blocked by something, for example, even when the inkjet recording apparatus body 101 is housed in a rack, or even when something is placed on the top surface of the apparatus body 101, the ink cartridge 200 can be easily replaced.

Here, the explanation is made with reference to an application in a serial type (shuttle type) inkjet recording apparatus in which the carriage scans is described. The inkjet recording apparatus is also applicable to a line type inkjet recording apparatus having a line head.

The inkjet recording apparatus and inkjet recording method of the present invention are applicable to various recording using inkjet recording system. For example, the inkjet recording apparatus and inkjet recording method can be particularly preferably applied to inkjet recording printers, inkjet recording facsimiles, inkjet recording copiers, and inkjet recording printer/fax/copy complex machines.

An inkjet head to which the present invention is applied will be described hereinafter.

Figure 6:
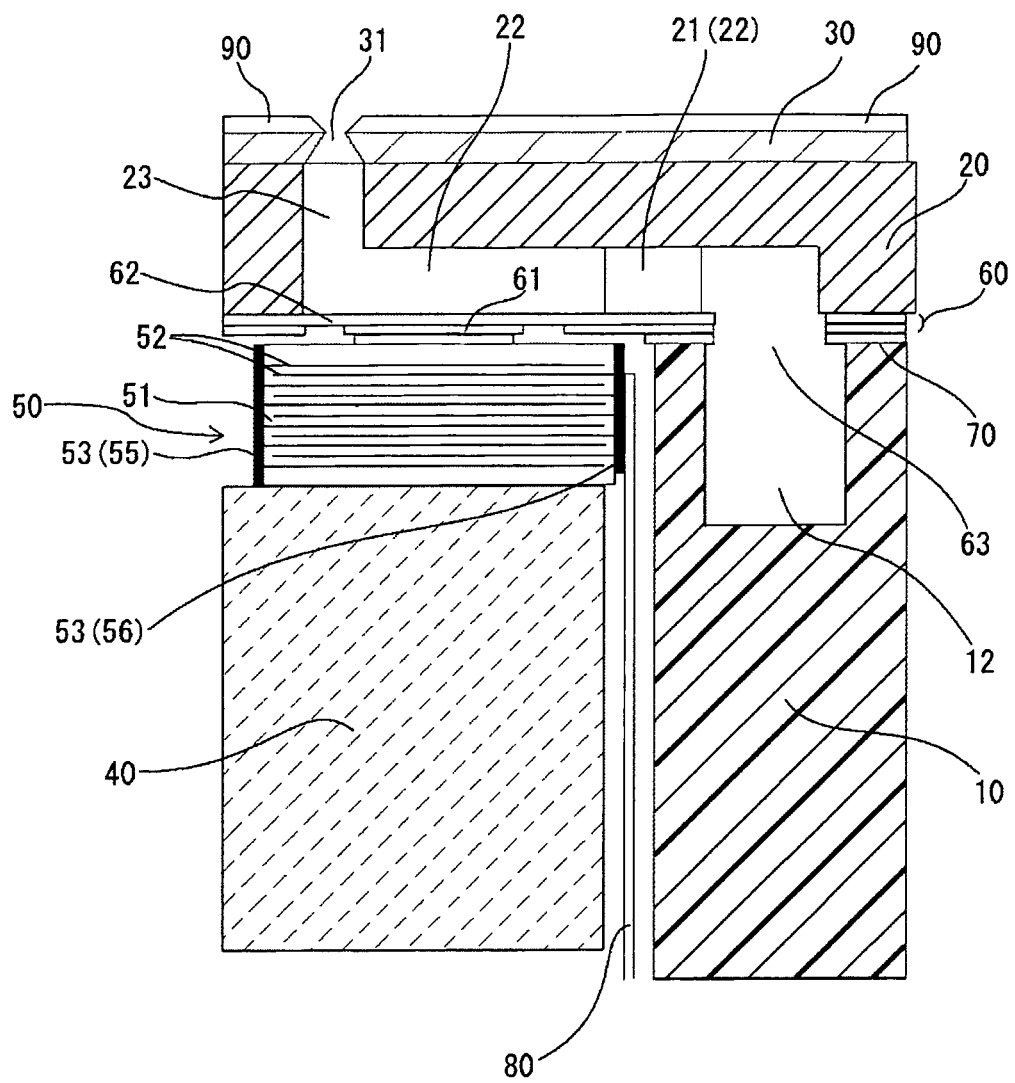
FIG. 6 is an enlarged view exemplarily showing components of an inkjet head suitably used in the present invention.
Figure 7:
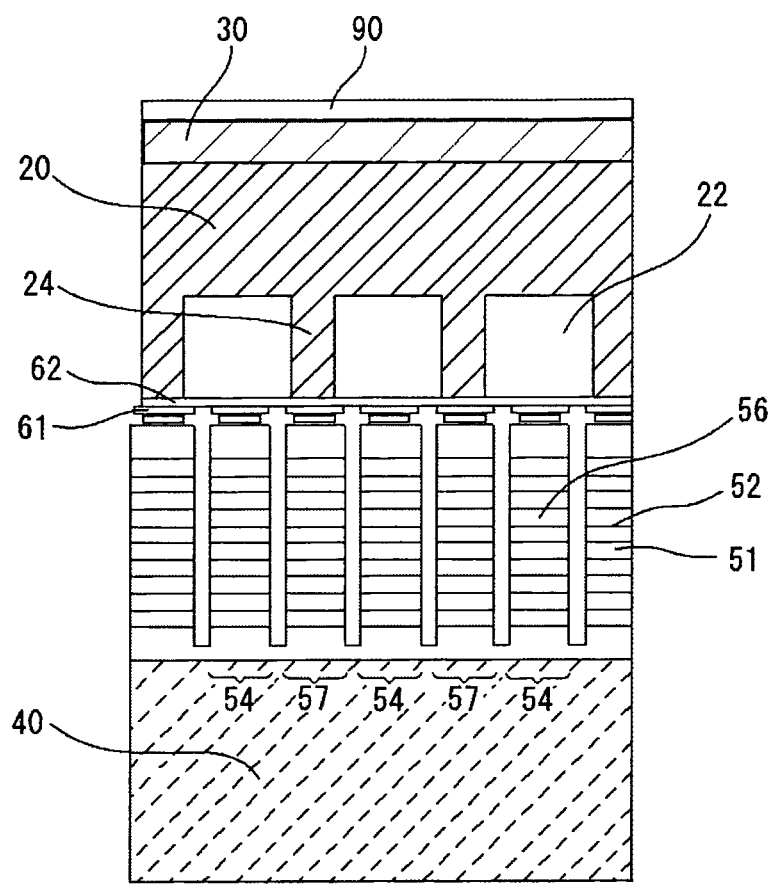
FIG. 7 is an enlarged cross-sectional view exemplarily showing the core part of the inkjet head in the inter-channel direction, which is shown in FIG. 6.

FIG. 6 is an enlarged view exemplarily showing the core part of an inkjet head according to an embodiment of the present invention. FIG. 7 is an enlarged cross-sectional view of the core part of the same head in the inter-channel direction.

This inkjet head is provided with a frame 10 having cutouts serving as an ink supply port (not shown) which supplies an ink from the front side of the figure toward the inner side direction thereof and a common liquid chamber 12 formed thereon; a passage plate 20 having cutouts serving as a fluid dragging part 21 and a pressurized liquid chamber 22 and a communication port 23 that communicates to a nozzle 31 formed thereon; a nozzle plate constituting the nozzle 31; a diaphragm 60 having a raised part 61, a diaphragm part 62 and an ink inflow port 63; a laminated piezoelectric element 50 connected to the diaphragm 60 via an adhesive layer 70; and a base 40 on which the laminated piezoelectric element 50 is fixed. The base 40 is made of barium titanate ceramics, on which two rows of laminated piezoelectric element 50 are arranged and connected.

The piezoelectric element 50 consists of alternately laminated piezoelectric layers 51 of lead zirconate titanate (PZT) having a thickness of 10 µm to 50 µm per layer and internal electrode layers 52 of silver palladium (AgPd) having a thickness of several µm per layer. The internal electrode layers 52 are connected to external electrodes 53 at both ends.

The alternately laminated piezoelectric element 50 is divided into a comb-like shape by half-cut dicing, having driving parts 56 and supporting parts (non-driving part) 57 every other division (FIG. 7). The outer end of one of the two external electrodes 53 is processed, for example, is notched, for limiting on length, thereby being divided by half-cut dicing. The outer end is connected to one end of the internal electrodes 52 at a position in the front side direction of the figure or the inner side direction. Then, the division of the external electrode 53 makes multiple separate electrodes 54. The other is not divided by dicing, and is conductive and serves as a common electrode 55.

A FPC (reference numeral 80) is soldered to the individual electrodes 54 of the driving part. The common electrode 55 is turned in an electrode layer provided at the end of the laminated piezoelectric element and connected to the Gnd electrode of the FPC 80. An not-shown driver IC is mounted on the FPC 80 to control the application of driving voltage to the driving part 56.

As for the diaphragm 60, a thin film diaphragm part 62, an island-shaped raised part (island part) 61 formed at the center of the diaphragm part 62 and connected to the laminated piezoelectric element 50 serving as the driving parts 56, a thick part including beams to be connected to the supporting part, and an opening serving as in ink inflow port 63 are formed by electroforming two nickel plated films in piles. The diaphragm part has a thickness of 3 µm and a width (one side) of 35 µm.

The connections between the island-shaped raised part 61 of the diaphragm 60 and the movable parts 56 of the laminated piezoelectric element 50 and between the diaphragm 60 and the frame 10 are made by patterning the adhesive layer 70 including a gap material.

The passage plate 20 is made of a silicon mono-crystalline substrate, in which cutouts serving as a liquid dragging part 21 and a pressurized liquid chamber 22 and a through-hole 23 provided at the corresponding position to the nozzle 31 and serving as a communication port 23 are patterned by etching.

The remaining part after the etching serves as a partition wall 24 of the pressurized liquid chamber 22. In this head, a part etched in a smaller width is provided, which serves as the liquid dragging part 21.

The nozzle plate 30 is made of a metal material such as a nickel plated film formed by electroforming and has a number of nozzles 31 serving as fine discharge openings for discharging ink droplets. The nozzle 31 has a horn-like (nearly cylindrical or nearly truncated cone) internal shape (inner shape). The nozzle 31 has a diameter of approximately 20 µm to 35 µm at the ink droplets discharge side. The nozzle pitch in each row is 150 dpi.

The ink discharging surface (nozzle front side) of the nozzle plate 30 is provided with an ink-repellent layer 90 serving as a water-repellent finish film. A water-repellent finish film selected according to ink's physical properties, such as from PTFE-Ni eutectoid plating; and electrodeposition of fluororesin; deposition of volatile fluororesin such as fluoro pitch; and silicone resin and fluororesin solvent application and baking can be provided to stabilize ink droplet shapes and discharging property to ensure a high image quality. Among them, for example many fluororesins are known, and excellent water-repellency can be obtained by depositing modified perfluoropolyoxethane (trade name: Optool DSX available from Daikin Industries, Ltd.) to a thickness of 300 nm to 1,000 nm (30 angstroms to 100 angstroms).

The frame 10 in which cutouts serving as an ink supply inlet and a common liquid chamber 12 are formed is made by molding a resin.

In an inkjet head having the above structure, a driving waveform (10V to 50V pulse voltage) is applied to the driving part 56 according to recording signals. The driving part 56 is shifted in the lamination direction. The pressurized liquid chamber 22 is pressurized via the nozzle plate 30 and the pressure is increased, thereby ink droplets are discharged through the nozzle 31.

After the ink droplets discharge is completed, the ink pressure in the pressurized liquid chamber 22 is reduced. The inertia ink flow and driving pulse discharge process causes negative pressure within the pressurized liquid chamber 22, leading to the ink supply process. Meanwhile, the ink supplied from the ink tank enters the common liquid chamber 12 and further fills the pressurized liquid chamber 22 from the common liquid chamber 12 via the ink inflow port 63 and fluid dragging part 21.

The fluid dragging part 21 effectively attenuates residual pressure fluctuation while it stands against recharging (refilling) due to surface tension. Appropriately selected dragging part balances residual pressure attenuation with refilling time and shortens the transition time to the next ink droplets discharge operation (driving cycle).

(Ink Record)

An ink record on which an image is recorded by means of the inkjet recording apparatus and the recording method of the present invention are the ink records of the present invention. The ink record of the present invention has images recorded on recording media using the recording ink of the present invention.

The ink record has high quality images, causes less exudation of ink, excels in temporal stability and can be suitably applied to various purposes as documents with various prints and/or images recorded thereon, and the like.

EXAMPLE

Hereafter, the present invention will be further described in detail referring to specific Examples and Comparative Examples, however, the present invention is not limited to the disclosed Examples.

Preparation Example 1

Surface-Finished Carbon Black Pigment Dispersion

Ninety grams (90 g) of a carbon black having a CTAB specific surface area of 150 $m^2/g$ and a DBP oil absorption of 100 mL/100 g was added to 3,000 mL of a sodium sulfate solution 2.5N, and the mixture was stirred at 60° C. and a stirring rate of 300 rpm to be reacted for 10 hours for oxidation treatment. The reactant was filtrated, and the filtrated carbon black was neutralized with a sodium hydroxide solution, and the neutralized carbon black was ultrafiltrated. The obtained carbon black was washed, dried, and then dispersed in pure water in such a way that the carbon black content was 20% by mass.

Preparation Example 2

Preparation of Surface-Finished Cyan Pigment

C.I. Pigment Cyan 15:3 was used as a cyan pigment, and the pigment was plasma-treated at a low temperature to prepare a pigment into which a carboxylic acid group was introduced. The prepared pigment was dispersed in an ion exchange water, and the pigment dispersion was desalinated and condensed to thereby yield a cyan pigment dispersion 1 having a pigment concentration of 15%.

Preparation Example 3

Preparation of Surface-Finished Magenta Pigment

A surface-modified magenta pigment was prepared in the same manner as in Preparation Example 2 except that C.I. Pigment Red 122 was used instead of C.I. Pigment Cyan 15:3. Similarly to the above-noted examples, the obtained surface-modified color pigment was easily dispersed in the water-based medium during the stirring process.

Preparation Example 4

Preparation of Surface-Finished Yellow Pigment Dispersion)

A surface-modified yellow pigment was prepared in the same manner as in Preparation Example 2 except that C.I. Pigment Yellow 128 was used instead of C.I. Pigment Cyan 15:3. Similarly to the above-noted examples, the obtained surface-modified color pigment was easily dispersed in the water-based medium during the stirring process.

Synthesis Example 1

Preparation of Polymer Dispersion

The inside of a 1 L flask equipped with a mechanical stirrer, a thermometer, a nitrogen gas inlet tube, a reflux tube, and a dropping funnel was sufficiently nitrogen-substituted. Then, 11.2 g of styrene, 2.8 g of acrylic acid, 12.0 g of lauryl methacrylate, 4.0 g of polyethylene glycol methacrylate, 4.0 g of styrene macromer (trade name: AS-6, available from TOA KASEI Co., Ltd.), and 0.4 g of mercapto-ethanol were poured in the flask, and the temperature was raised to 65° C. Next, a mixture solution containing 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (trade name: AS-6, available from TOA KASEI Co., Ltd.), 3.6 g of mercapto-ethanol, 2.4 g of azobisdimethyl valeronitrile, and 18 g of methylethylketone was delivered by drops into the flask through the dropping funnel over a period of 2.5 hours. After the dropping was completed, a mixture solution containing 0.8 g of azobisdimethyl valeronitril and 18 g of methylethylketone was delivered by drops into the flask through the dropping funnel over a period of 0.5 hours. The mixture was aged at 65° C. for 1 hour, 0.8 g of azobisdimethyl valeronitrile was added to the mixture, and the mixture was further aged for 1 hour. After the completion of reaction, 364 g of methylethylketone was added into the flask to yield 800 g of a polymer solution having a polymer concentration of 50%.

Preparation Example 5

Preparation of Polymer Fine Particle Dispersion Containing Carbon Black

Twenty-eight grams (28 g) of the polymer solution prepared in Synthesis Example 1 and 26 g of carbon black, 13.6 g of 1 mole/L potassium hydroxide solution, 20 g of methylethylketone, and 30 g of ion exchange water were sufficiently stirred and then kneaded using a three-roller mill. The obtained paste was put in 200 g of ion exchange water and sufficiently stirred, and then methylethylketone and water were distilled away using an evaporator to thereby yield a black-color polymer fine particle dispersion.

Preparation Example 6

Preparation of Polymer Fine Particle Dispersion Containing a Phthalocyanine Pigment A black-color polymer fine particle dispersion was obtained in the same manner as in Preparation Example 5 except that the carbon black pigment was changed to a phthalocyanine pigment.

Preparation Example 7

Preparation of Polymer Fine Particle Dispersion Containing a Dimethylquinacridone Pigment A magenta-color polymer fine particle dispersion was obtained in the same manner as in Preparation Example 5 except that the carbon black pigment was changed to C.I. Pigment Red 122.

Preparation Example 8

Preparation of Polymer Fine Particle Dispersion Containing a Monoazo Yellow Pigment A yellow-color polymer fine particle dispersion was obtained in the same manner as in Preparation Example 5 except that the carbon black pigment was changed to C.I. Pigment Yellow 74.

Production Example 1

—Production of Black Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 1 | 8.0% by mass (by solid content) |
| Acrylic resin fine particles | 5.5% by mass (by solid content) (Aquabrid 4720, average particle diameter: 95 nm, available from DAICEL CHEMICAL INDUSTRIES, LTD.) |
| Glycerin (surface tension: 63.3 mN/m) | 8.5% by mass |
| 2-methyl-2,4-pentanediol (surface tension: 27 mN/m) | 17.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 58.0% by mass |

Production Example 2

—Production of Cyan Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 2 | 5.0% by mass (by solid content) |
| Acrylic resin fine particles | 4.0% by mass (by solid content) (Aquabrid 4720, available from DAICEL CHEMICAL INDUSTRIES, LTD.) |
| Glycerin (surface tension: 63.3 mN/m) | 7.0% by mass |
| 3-methyl-1,3-butanediol (surface tension: 32.8 mN/m) | 21.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 60.0% by mass |

Production Example 3

—Production of Magenta Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>.

| | |
|---|---|
| Pigment dispersion of Preparation Example 3 | 8.0% by mass (by solid content) |
| Acrylic resin fine particles | 3.20% by mass (by solid content) (Aquabrid 4720, available from DAICEL CHEMICAL INDUSTRIES, LTD.) |
| Glycerin (surface tension: 63.3 mN/m) | 7.0% by mass |
| 3-methyl-1,3-butanediol (surface tension: 32.8 mN/m) | 21.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 57.8% by mass |

Production Example 4

—Production of Yellow Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 4 | 5.0% by mass (by solid content) |
| Acrylic resin fine particles | 4.0% by mass (by solid content) (Aquabrid 4720, available from |

| | |
|---|---|
| Glycerin (surface tension: 63.3 mN/m) | 7.0% by mass |
| 3-methyl-1,3-butanediol (surface tension: 32.8 mN/m) | 21.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ ... (I) | 1.0% by mass |
| DAICEL CHEMICAL INDUSTRIES, LTD.) | |

In the Structural Formula (I), m = 2, and n = 10.

| | |
|---|---|
| Ion exchange water | 60.0% by mass |

Production Example 5

—Production of Cyan Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 2 | 5.0% by mass (by solid content) |
| Acrylic resin fine particles | 4.0% by mass (by solid content) |
| | (Aquabrid 4720, available from DAICEL CHEMICAL INDUSTRIES, LTD.) |
| Glycerin (surface tension: 63.3 mN/m) | 7.5% by mass |
| 1,3-butanediol (surface tension: 37.8 mN/m) | 22.5% by mass |
| 2-ethyl-1,3-hexanediol | 2.0% by mass |
| Fluorochemical surfactant represented by Structural Formula (II) | 1.0% by mass |

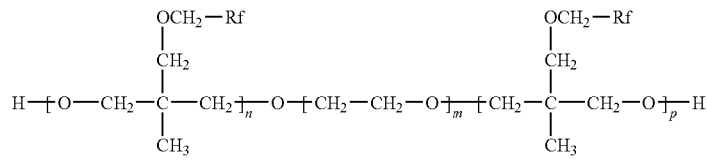

(II)

In the Structural Formula (II), n = 4, m = 2, p = 4, and RF = $CF_2CF_3$.

| | |
|---|---|
| Ion exchange water | 60.0% by mass |

Production Example 6

—Production of Magenta Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 3 | 8.0% by mass (by solid content) |
| Acrylic resin fine particles | 3.2% by mass (by solid content) |
| | (Aquabrid 4720, available from DAICEL CHEMICAL INDUSTRIES, LTD.) |
| Glycerin (surface tension: 63.3 mN/m) | 7.5% by mass |
| 1,3-butanediol (surface tension: 37.8 mN/m) | 22.5% by mass |
| 2-ethyl-1,3-hexanediol | 2.0% by mass |
| Fluorochemical surfactant represented by Structural Formula (II) | 1.0% by mass |

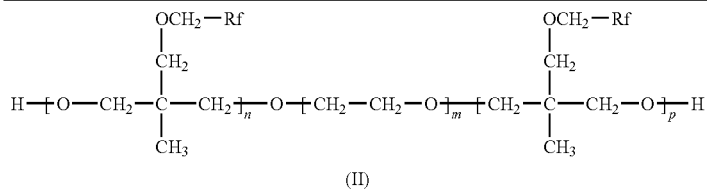

(II)
In the Structural Formula (II), n = 4, m = 2, p = 4, and RF = CF$_2$CF$_3$.

| | |
|---|---|
| Ion exchange water | 55.8% by mass |

Production Example 7

—Production of Yellow Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 4 | 5.0% by mass (by solid content) |
| Acrylic resin fine particles | 4.0% by mass (by solid content) |
| | (Aquabrid 4720, available from DAICEL CHEMICAL INDUSTRIES, LTD.) |
| Glycerin (surface tension: 63.3 mN/m) | 7.5% by mass |
| 1,3-butanediol (surface tension: 37.8 mN/m) | 22.5% by mass |
| 2-ethyl-1,3-hexanediol | 2.0% by mass |
| Fluorochemical surfactant represented by Structural Formula (II) | 1.0% by mass |

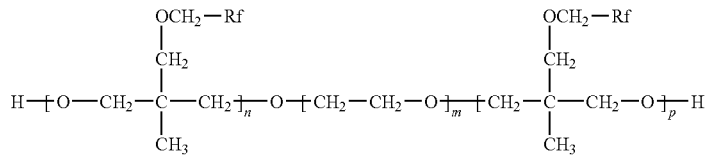

(II)
In the Structural Formula (II), n = 4, m = 2, p = 4, and RF = CF$_2$CF$_3$.

| | |
|---|---|
| Ion exchange water | 58.0% by mass |

Production Example 8

—Production of Black Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 1 | 8.0% by mass (by solid content) |
| Polyester-urethane resin fine particles | 4.0% by mass (by solid content) |
| | (Hydran HW930, average particle diameter: 102 nm, available from Dainippon Ink and Chemicals, Inc.) |
| Glycerin (surface tension: 63.3 mN/m) | 7.0% by mass |
| 3-methyl-1,3-butanediol (surface tension: 32.8 mN/m) | 21.0% by mass |
| 2-ethyl-1,3-hexanediol | 2.0% by mass |
| Fluorochemical surfactant represented by Structural Formula (III) | 1.0% by mass |

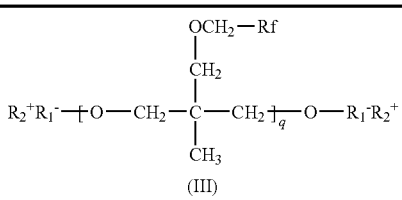

(III)
In Structural Formula (III), q = 6, R$_1$ = NH$_4$, R$_2$ = SO$_3$, and Rf = CF$_2$CF$_3$.

| | |
|---|---|
| Ion exchange water | 57.0% by mass |

Production Example 9

—Production of Cyan Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 2 | 5.0% by mass (by solid content) |
| Polyester-urethane resin fine particles | 4.0% by mass (by solid content) (Hydran HW930, available from Dainippon Ink and Chemicals, Inc.) |
| Glycerin (surface tension: 63.3 mN/m) | 7.5% by mass |
| 1,3-butanediol (surface tension: 37.8 mN/m) | 22.5% by mass |
| 2-ethyl-1,3-hexanediol | 2.0% by mass |
| Nonionic surfactant (Softanol EP7025, available from NIPPON SHOKUBAI CO., LTD.) | 1.0% by mass |
| Ion exchange water | 58.0% by mass |

Production Example 10

—Production of Magenta Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 3 | 8.0% by mass (by solid content) |
| Polyester-urethane resin fine particles | 3.2% by mass (by solid content) (Hydran HW930, available from Dainippon Ink and Chemicals, Inc.) |
| Glycerin (surface tension: 63.3 mN/m) | 7.5% by mass |
| 1,3-butanediol (surface tension: 37.8 mN/m) | 22.5% by mass |
| 2-ethyl-1,3-hexanediol | 2.0% by mass |
| Nonionic surfactant (Softanol EP7025, available from NIPPON SHOKUBAI CO., LTD.) | 1.0% by mass |
| Ion exchange water | 55.8% by mass |

Production Example 11

—Production of Yellow Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 4 | 5.0% by mass (by solid content) |
| Polyester-urethane resin fine particles | 4.0% by mass (by solid content) (Hydran HW930, available from Dainippon Ink and Chemicals, Inc.) |
| Glycerin (surface tension: 63.3 mN/m) | 7.5% by mass |
| 1,3-butanediol (surface tension: 37.8 mN/m) | 22.5% by mass |
| 2-ethyl-1,3-hexanediol | 2.0% by mass |
| Nonionic surfactant (Softanol EP7025, available from NIPPON SHOKUBAI CO., LTD.) | 1.0% by mass |
| Ion exchange water | 58.0% by mass |

Production Example 12

—Production of Black Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 5 | 8.0% by mass (by solid content) |
| Glycerin (surface tension: 63.3 mN/m) | 8.0% by mass |
| 1,3-butanediol (surface tension: 37.8 mN/m) | 24.0% by mass |
| 2-ethyl-1,3-hexanediol | 2.0% by mass |
| Fluorochemical surfactant represented by Structural Formula (III) | 1.0% by mass |

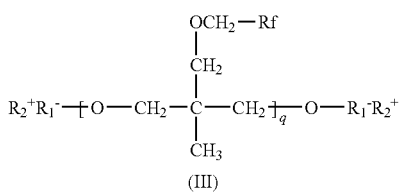

(III)
In Structural Formula (III), $q = 6$, $R_1 = NH_4$, $R_2 = SO_3$, and $Rf = CF_2CF_3$.

| | |
|---|---|
| Ion exchange water | 57.0% by mass |

Production Example 13

Production of Cyan Pigment Ink

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

Ink Composition

| | |
|---|---|
| Pigment dispersion of Preparation Example 6 | 6.0% by mass (by solid content) |
| Glycerin (surface tension: 63.3 mN/m) | 8.2% by mass |
| Triethylene glycol (surface tension: 45.2 mN/m) | 25.6% by mass |
| 2-ethyl-1,3-hexanediol | 2.0% by mass |
| Fluorochemical surfactant represented by Structural Formula (III) | 1.0% by mass |

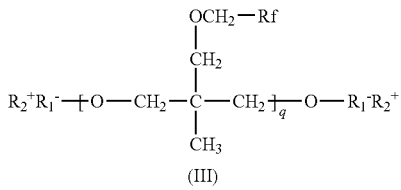

(III)
In Structural Formula (III), $q = 6$, $R_1 = NH_4$, $R_2 = SO_3$, and $Rf = CF_2CF_3$.

| | |
|---|---|
| Ion exchange water | 57.2% by mass |

Production Example 14

Production of Magenta Pigment Ink

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

Ink Composition

| | |
|---|---|
| Pigment dispersion of Preparation Example 7 | 8.0% by mass (by solid content) |
| Glycerin (surface tension: 63.3 mN/m) | 8.2% by mass |
| Triethylene glycol (surface tension: 45.2 mN/m) | 25.6% by mass |
| 2-ethyl-1,3-hexanediol | 2.0% by mass |
| Fluorochemical surfactant represented by Structural Formula (III) | 1.0% by mass |

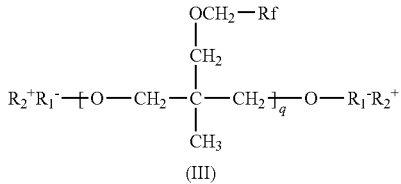

(III)
In Structural Formula (III), $q = 6$, $R_1 = NH_4$, $R_2 = SO_3$, and $Rf = CF_2CF_3$.

| | |
|---|---|
| Ion exchange water | 55.2% by mass |

Production Example 15

—Production of Yellow Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

Ink Composition

| | |
|---|---|
| Pigment dispersion of Preparation Example 8 | 6.0% by mass (by solid content) |
| Glycerin (surface tension: 63.3 mN/m) | 8.2% by mass |
| Triethylene glycol (surface tension: 45.2 mN/m) | 25.6% by mass |
| 2-ethyl-1,3-hexanediol | 2.0% by mass |
| Fluorochemical surfactant represented by Structural Formula (III) | 1.0% by mass |

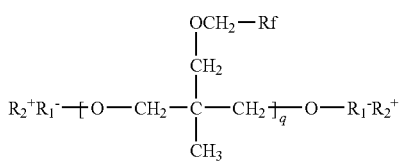

(III)
In Structural Formula (III), $q = 6$, $R_1 = NH_4$, $R_2 = SO_3$, and $Rf = CF_2CF_3$.

| | |
|---|---|
| Ion exchange water | 57.2% by mass |

Production Example 16

—Production of Black Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

Ink Composition

| | |
|---|---|
| Pigment dispersion of Preparation Example 1 | 8.0% by mass (by solid content) |
| Acrylic resin fine particles | 5.5% by mass (by solid content) (Aquabrid 4720, available from DAICEL CHEMICAL INDUSTRIES, LTD.) |
| 2-methyl-2,4-pentanediol (surface tension: 27 mN/m) | 20.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), $m = 2$, and $n = 10$. | 1.0% by mass |
| Ion exchange water | 65.5% by mass |

Production Example 17

—Production of Cyan Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 2 | 6.0% by mass (by solid content) |
| Acrylic resin fine particles | 4.0% by mass (by solid content) (Aquabrid 4720, available from DAICEL CHEMICAL INDUSTRIES, LTD.) |
| 1,5-pentanediol (surface tension: 43.2 mN/m) | 18.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 71.0% by mass |

Production Example 18

—Production of Magenta Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.
<Ink Composition>

| | |
|---|---|
| Pigment dispersion of Preparation Example 3 | 8.0% by mass (by solid content) |
| Acrylic resin fine particles | 5.5% by mass (by solid content) (Aquabrid 4720, available from DAICEL CHEMICAL INDUSTRIES, LTD.) |
| 1,5-pentanediol (surface tension: 43.2 mN/m) | 17.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 68.5% by mass |

Production Example 19

—Production of Yellow Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.
<Ink Composition>

| | |
|---|---|
| Pigment dispersion of Preparation Example 4 | 6.0% by mass (by solid content) |
| Acrylic resin fine particles | 4.0% by mass (by solid content) (Aquabrid 4720, available from DAICEL CHEMICAL INDUSTRIES, LTD.) |
| 1,5-pentanediol (surface tension: 43.2 mN/m) | 18.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 71.0% by mass |

Production Example 20

—Production of Black Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.
<Ink Composition>

| | |
|---|---|
| Pigment dispersion of Preparation Example 5 | 7.0% by mass (by solid content) |
| Glycerin (surface tension: 63.3 mN/m) | 12.0% by mass |
| 1,3-butanediol (surface tension: 37.8 mN/m) | 24.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 54.0% by mass |

Production Example 21

—Production of Cyan Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.
<Ink Composition>

| | |
|---|---|
| Pigment dispersion of Preparation Example 5 | 5.0% by mass (by solid content) |
| Glycerin (surface tension: 63.3 mN/m) | 10.0% by mass |
| 1,5-pentanediol (surface tension: 43.2 mN/m) | 28.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 54.0% by mass |

Production Example 22

—Production of Magenta Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.
<Ink Composition>

| | |
|---|---|
| Pigment dispersion of Preparation Example 6 | 7.0% by mass (by solid content) |
| Glycerin (surface tension: 63.3 mN/m) | 10.0% by mass |
| 1,5-pentanediol (surface tension: 43.2 mN/m) | 28.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ . . . (I) In the Structural Formula (I), m = 2, and n = 10. | 1.0% by mass |
| Ion exchange water | 52.0% by mass |

Production Example 23

—Production of Yellow Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.
<Ink Composition>

| | |
|---|---|
| Pigment dispersion of Preparation Example 7 | 5.0% by mass (by solid content) |
| Glycerin (surface tension: 63.3 mN/m) | 10.0% by mass |
| 1,5-pentanediol (surface tension: 43.2 mN/m) | 28.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ . . . (I) In the Structural Formula (I), m = 2, and n = 10. | 1.0% by mass |
| Ion exchange water | 54.0% by mass |

Production Example 24

—Production of Black Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.
<Ink Composition>

| | |
|---|---|
| Pigment dispersion of Preparation Example 1 | 8.0% by mass (by solid content) |
| Acrylic resin fine particles | 5.0% by mass (by solid content) (Aquabrid 4720, available from DAICEL CHEMICAL INDUSTRIES, LTD.) |
| Glycerin (surface tension: 63.3 mN/m) | 9.0% by mass |
| 3-methyl-1,3-pentanediol (surface tension: 32.8 mN/m) | 18.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ . . . (I) In the Structural Formula (I), m = 2, and n = 10. | 1.0% by mass |
| Ion exchange water | 57.0% by mass |

Production Example 25

—Production of Black Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.
<Ink Composition>

| | |
|---|---|
| Pigment dispersion of Preparation Example 1 | 8.0% by mass (by solid content) |
| Acrylic resin fine particles | 5.5% by mass (by solid content) (Aquabrid 4720, available from DAICEL CHEMICAL INDUSTRIES, LTD.) |
| 2-methyl-2,4-pentanediol (surface tension: 27 mN/m) | 14.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ . . . (I) In the Structural Formula (I), m = 2, and n = 10. | 1.0% by mass |
| Ion exchange water | 69.5% by mass |

Production Example 26

—Production of Cyan Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.
<Ink Composition>

| | |
|---|---|
| Pigment dispersion of Preparation Example 2 | 6.0% by mass (by solid content) |
| Acrylic resin fine particles | 4.0% by mass (by solid content) (Aquabrid 4720, available from DAICEL CHEMICAL INDUSTRIES, LTD.) |
| 1,5-pentanediol (surface tension: 43.2 mN/m) | 7.5% by mass |
| 1,3-butanediol (surface tension: 43.2 mN/m) | 14.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ . . . (I) In the Structural Formula (I), m = 2, and n = 10. | 1.0% by mass |
| Ion exchange water | 73.0% by mass |

Production Example 27

—Production of Magenta Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 3 | 8.0% by mass (by solid content) |
| Acrylic resin fine particles | 5.5% by mass (by solid content) (Aquabrid 4720, available from DAICEL CHEMICAL INDUSTRIES, LTD.) |
| 1,5-pentanediol (surface tension: 43.2 mN/m) | 14.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 69.5% by mass |

Production Example 28

—Production of Yellow Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 4 | 6.0% by mass (by solid content) |
| Acrylic resin fine particles | 4.0% by mass (by solid content) (Aquabrid 4720, available from DAICEL CHEMICAL INDUSTRIES, LTD.) |
| 1,5-pentanediol (surface tension: 43.2 mN/m) | 14.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 73.0% by mass |

Production Example 29

—Production of Black Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 5 | 7.0% by mass (by solid content) |
| Glycerin (surface tension: 63.3 mN/m) | 13.0% by mass |
| 1,3-butanediol (surface tension: 37.8 mN/m) | 28.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 49.0% by mass |

Production Example 30

—Production of Cyan Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 5 | 5.0% by mass (by solid content) |
| Glycerin (surface tension: 63.3 mN/m) | 10.0% by mass |
| 1,5-petanediol (surface tension: 43.2 mN/m) | 31.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 51.0% by mass |

Production Example 31

—Production of Magenta Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 6 | 7.0% by mass (by solid content) |
| Glycerin (surface tension: 63.3 mN/m) | 10.0% by mass |
| 1,5-petanediol (surface tension: 43.2 mN/m) | 31.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 49.0% by mass |

Production Example 32

—Production of Yellow Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 7 | 5.0% by mass (by solid content) |
| Glycerin (surface tension: 63.3 mN/m) | 10.0% by mass |
| 1,5-petanediol (surface tension: 43.2 mN/m) | 31.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 51.0% by mass |

Production Example 33

—Production of Black Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 1 | 8.0% by mass (by solid content) |
| Acrylic resin fine particles | 5.5% by mass (by solid content) (Aquabrid 4720, available from DAICEL CHEMICAL INDUSTRIES, LTD.) |
| Glycerin (surface tension: 63.3 mN/m) | 8.5% by mass |
| 2-methyl-2,4-pentanediol (surface tension: 27 mN/m) | 17.0% by mass |
| 2-ethyl-1,3-hexanediol | 2.0% by mass |
| Ion exchange water | 59.0% by mass |

Production Example 34

—Production of Cyan Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 2 | 5.0% by mass (by solid content) |
| Acrylic resin fine particles | 4.0% by mass (by solid content) (Aquabrid 4720, available from DAICEL CHEMICAL INDUSTRIES, LTD.) |
| Glycerin (surface tension: 63.3 mN/m) | 7.0% by mass |
| 3-methyl-1,3-butanediol (surface tension: 32.8 mN/m) | 21.0% by mass |
| 2-ethyl-1,3-hexanediol | 2.0% by mass |
| Ion exchange water | 61.0% by mass |

Production Example 35

—Production of Magenta Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 3 | 8.0% by mass (by solid content) |
| Acrylic resin fine particles | 3.2% by mass (by solid content) (Aquabrid 4720, available from DAICEL CHEMICAL INDUSTRIES, LTD.) |
| Glycerin (surface tension: 63.3 mN/m) | 7.0% by mass |
| 3-methyl-1,3-butanediol (surface tension: 32.8 mN/m) | 21.0% by mass |
| 2-ethyl-1,3-hexanediol | 2.0% by mass |
| Ion exchange water | 58.8% by mass |

Production Example 36

—Production of Yellow Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 4 | 5.0% by mass (by solid content) |
| Acrylic resin fine particles | 4.0% by mass (by solid content) (Aquabrid 4720, available from DAICEL CHEMICAL INDUSTRIES, LTD.) |
| Glycerin (surface tension: 63.3 mN/m) | 7.0% by mass |
| 3-methyl-1,3-butanediol (surface tension: 32.8 mN/m) | 21.0% by mass |
| 2-ethyl-1,3-hexanediol | 2.0% by mass |
| Ion exchange water | 61.0% by mass |

Production Example 37

—Production of Black Pigment Ink —

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 1 | 8.0% by mass (by solid content) |
| Glycerin (surface tension: 63.3 mN/m) | 8.0% by mass |
| 1,3-butanediol (surface tension: 37.8 mN/m) | 24.0% by mass |
| 2-ethyl-1,3-hexanediol | 2.0% by mass |
| Fluorochemical surfactant represented by Structural Formula (I) $CF_3CF_2(CF_2CF_2)_m$—$CH_2CH_2O(CH_2CH_2O)_nH$ ... (I) In the Structural Formula (I), m = 2, and n = 10. | 1.0% by mass |
| Ion exchange water | 57.0% by mass |

Production Example 38

—Production of Cyan Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 2 | 6.0% by mass (by solid content) |
| Glycerin (surface tension: 63.3 mN/m) | 8.2% by mass |
| Triethylene glycol (surface tension: 45.2 mN/m) | 25.6% by mass |
| 2-ethyl-1,3-hexanediol | 2.0% by mass |
| Nonionic surfactant (Softanol EP7025, available from NIPPON SHOKUBAI CO., LTD.) | 1.0% by mass |
| Ion exchange water | 57.2% by mass |

Production Example 39

—Production of Magenta Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 3 | 8.0% by mass (by solid content) |
| Glycerin (surface tension: 63.3 mN/m) | 8.2% by mass |
| Triethylene glycol (surface tension: 45.2 mN/m) | 25.6% by mass |
| 2-ethyl-1,3-hexanediol | 2.0% by mass |
| Nonionic surfactant (Softanol EP7025, available from NIPPON SHOKUBAI CO., LTD.) | 1.0% by mass |
| Ion exchange water | 55.2% by mass |

Production Example 40

—Production of Yellow Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 4 | 6.0% by mass (by solid content) |
| Glycerin (surface tension: 63.3 mN/m) | 8.2% by mass |
| Triethylene glycol (surface tension: 45.2 mN/m) | 25.6% by mass |
| 2-ethyl-1,3-hexanediol | 2.0% by mass |
| Nonionic surfactant (Softanol EP7025, available from NIPPON SHOKUBAI CO., LTD.) | 1.0% by mass |
| Ion exchange water | 57.2% by mass |

Production Example 41

—Production of Black Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 1 | 8.0% by mass (by solid content) |
| Acrylic resin fine particles | 5.5% by mass (by solid content) (Aquabrid 4720, average particle diameter: 95 nm, available from DAICEL CHEMICAL INDUSTRIES, LTD.) |
| Glycerin (surface tension: 63.3 mN/m) | 8.5% by mass |
| 2-methyl-2,4-pentanediol (surface tension: 27 mN/m) | 17.0% by mass |
| 2-ethyl-1,3-hexanediol | 2.0% by mass |
| Nonionic surfactant (Softanol EP7025, available from NIPPON SHOKUBAI CO., LTD.) | 1.0% by mass |
| Ion exchange water | 58.0% by mass |

Production Example 42

—Production of Black Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 1 | 8.0% by mass (by solid content) |
| Acrylic resin fine particles | 5.5% by mass (by solid content) (Aquabrid 4720, average particle diameter: 95 nm, available from DAICEL CHEMICAL INDUSTRIES, LTD.) |
| Glycerin (surface tension: 63.3 mN/m) | 8.5% by mass |
| 2-methyl-2,4-pentandiol (surface tension: 27 mN/m) | 17.0% by mass |
| 2-ethyl-1,3-hexanediol | 2.0% by mass |
| Fluorochemical surfactant represented by Structural Formula (II) | 1.0% by mass |

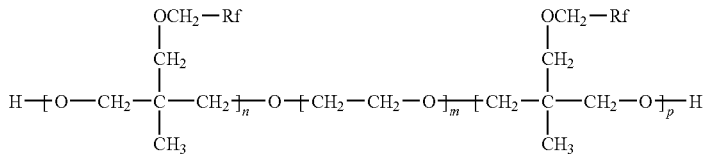

(II)
In the Structural Formula (II), $n = 4$, $m = 2$, $p = 4$, and $RF = CF_2CF_3$.

| | |
|---|---|
| Ion exchange water | 58.0% by mass |

Production Example 43

—Production of Cyan Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 2 | 5.0% by mass (by solid content) |
| Acrylic resin fine particles | 4.0% by mass (by solid content) (Aquabrid 4720, average particle diameter: 95 nm, available from DAICEL CHEMICAL INDUSTRIES, LTD.) |
| Glycerin (surface tension: 63.3 mN/m) | 7.5% by mass |
| 1,3-butanediol (surface tension: 37.8 mN/m) | 22.5% by mass |
| 2-ethyl-1,3-hexanediol | 2.0% by mass |
| Nonionic surfactant (Softanol EP7025, available from NIPPON SHOKUBAI CO., LTD.) | 1.0% by mass |
| Ion exchange water | 60.0% by mass |

Production Example 44

—Production of Magenta Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 3 | 8.0% by mass (by solid content) |
| Acrylic resin fine particles | 3.2% by mass (by solid content) (Aquabrid 4720, average particle diameter: 95 nm, available from DAICEL CHEMICAL INDUSTRIES, LTD.) |
| Glycerin (surface tension: 63.3 mN/m) | 7.5% by mass |
| 1,3-butanediol (surface tension: 37.8 mN/m) | 22.5% by mass |
| 2-ethyl-1,3-hexanediol | 2.0% by mass |
| Nonionic surfactant (Softanol EP7025, available from NIPPON SHOKUBAI CO., LTD.) | 1.0% by mass |
| Ion exchange water | 55.8% by mass |

Production Example 45

—Production of Yellow Pigment Ink—

An ink composition having the following formulation was prepared, and a 10% aqueous lithium hydroxide solution was added thereto such that the pH value of the ink composition solution was adjusted to 9. Then, the ink composition solution was filtrated through a membrane filter having an average pore diameter of 0.8 μm to thereby prepare a recording ink.

<Ink Composition>

| | |
|---|---|
| Pigment dispersion of Preparation Example 4 | 5.0% by mass (by solid content) |
| Acrylic resin fine particles | 4.0% by mass (by solid content) (Aquabrid 4720, average particle diameter: 95 nm, available from DAICEL CHEMICAL INDUSTRIES, LTD.) |
| Glycerin (surface tension: 63.3 mN/m) | 7.5% by mass |
| 1,3-butanediol (surface tension: 37.8 mN/m) | 22.5% by mass |
| 2-ethyl-1,3-hexanediol | 2.0% by mass |
| Nonionic surfactant | 1.0% by mass |

-continued (Softanol EP7025, available from
NIPPON SHOKUBAI CO., LTD.)
Ion exchange water                                58.0% by mass Examples 1 to 11 and Comparative Examples 1 to 3

Next, the obtained recording inks of Production Examples 1 to 45 were respectively evaluated as to various properties. Table 2-1 and Table 2-5 show the evaluation results.

<Volume Average Particle Diameter of Ink>

Each of the recording inks was diluted with pure water, and the volume average particle diameter (D 50%) thereof was measured using a particle size distribution measuring apparatus (Microtrack UPA, available from NIKKISO CO., LTD.).

<Ink Viscosity>

The ink viscosity of each of the recording inks was measured at a temperature of 25° C. using an R-type viscometer (TOKI SANGYO CO., LTD.).

<Ink Surface Tension>

The ink surface tension of each of the recording inks was measured using a static surface tension measuring device (BVP-Z, Kyowa Interface Science Co., Ltd.).

<Color Bleed>

Figure 3:
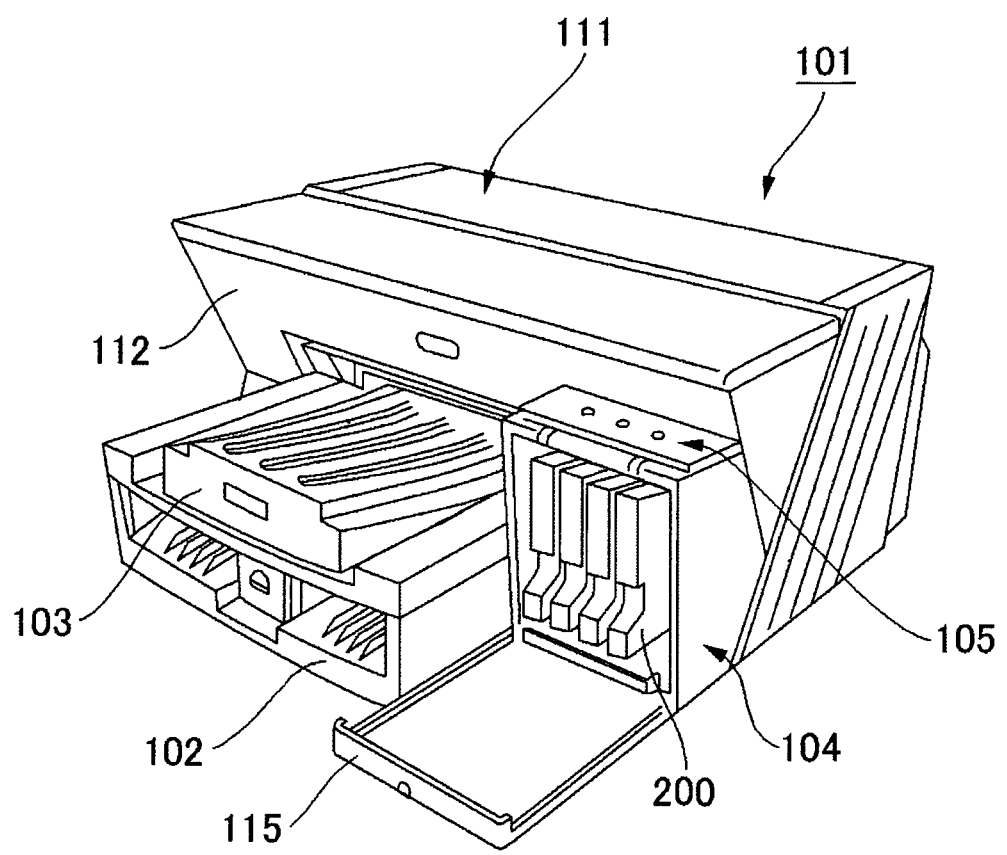
FIG. 3 is a perspective view exemplarily explaining an inkjet recording apparatus in the condition where the cover of the cartridge mounting part thereof is opened.

Inkjet printers shown in FIGS. 3 to 5 were respectively filled with each of the recording inks of Production Examples 1 to 45. Specifically, individual color recording inks for black, cyan, magenta, and yellow were combined to be a set of four colors as individual ink sets shown in Tables 1-1 to 1-4, and an image was printed on an αmatt paper (Hokuetsu Paper Mills Ltd.) using each of the ink sets.

The obtained images were visually checked to observe the bleeding state of the boundary portion between black ink and color ink.

The transfer amount of pure water to the α-matt paper was measured using a dynamic scanning liquid-absorptometer (DSA, available from KYOWA SEIKO K.K). The transfer amount of pure water to the recording medium for a contact time of 100 ms was 3.6 mL/m².

[Evaluation Criteria]

A: No color-bleed was found at the boundary portion between black and color, and the image was sharp and clear.

B: Color-bleed was hardly observed at the boundary portion between black and color, and the image was sharp and clear.

C: A little color-bleed was observed at the boundary portion between black and color, and the image was slightly inferior in image sharpness.

D: Significant color bleed was observed at the boundary portion between black and color, and the image did not have the required image sharpness.

<Secondary-Color Beading>

Inkjet printers shown in FIGS. 3 to 5 were respectively filled with each of the recording inks of Production Examples 1 to 45. Specifically, individual color recording inks for black, cyan, magenta, and yellow were combined to be a set of four colors as individual ink sets shown in Tables 1-1to 1-4, and an image was printed on an αmatt paper (Hokuetsu Paper Mills Ltd.) using each of the ink sets.

Secondary-color parts in red, blue, and green of the obtained image were evaluated as to beading based on the following criteria.

[Evaluation Criteria]

A: No color unevenness was found at secondary color parts of the image, and the image was sharp and clear.

B: Color unevenness was hardly observed at secondary color parts of the image, and the image was sharp and clear.

C: A little color unevenness was observed at secondary color parts of the image, the image was slightly inferior in image sharpness.

D: Significant color unevenness was observed at the boundary portion between black and color, and the image did not have the required image sharpness.

<Cockling>

Inkjet printers shown in FIGS. 3 to 5 were respectively filled with each of the recording inks of Production Examples 1 to 45. Specifically, individual color recording inks for black, cyan, magenta, and yellow were combined to be a set of four colors as individual ink sets shown in Tables 1-1 to 1-4, and an image was printed on an αmatt paper (Hokuetsu Paper Mills Ltd.) using each of the ink sets.

The printed material was evaluated as to whether or not cockling occurred, under the following criteria.

[Evaluation Criteria]

A: Neither paper curl nor wavy cockling was found in the printed material.

B: A little wavy cockling was found in the printed material, but paper curl was hardly observed.

C: The printed material had wavy cockles as a whole, and paper curl was observed at the edges thereof.

D: The printed material was curled and further had wavy cockles as a whole.

<Contact Angle>

The contact angle when each of the recording inks of Production Examples 1 to 45 were respectively dropped in an amount of 2 μL on αmatt paper (POD Gloss coat, available from OJI Paper Co.) was measured from a droplet image taken through the use of a CCD camera by using a measuring apparatus (OCA20, Dataphysics Co.) for automatically performing curve fitting to measure a contact angle. The contact angle was measured right after the start of dribbling of ink, and the contact angle measured right after the start of the dribbling was compared with the contact angle measured 100 ms after the start of the dribbling.

<Ink Discharge Stability>

Inkjet printers shown in FIGS. 3 to 5 were respectively filled with each of the recording inks of Production Examples 1 to 45. Specifically, individual color recording inks for black, cyan, magenta, and yellow were combined to be a set of four colors as individual ink sets shown in Tables 1-1 to 1-4. Then, 200 sheets of paper were consecutively printed at a resolution of 600 dpi, and the respective ink sets were evaluated as to discharge unevenness and undischarge failure based on the following criteria.

[Evaluation Criteria]

A: Neither discharge unevenness nor undischarge failure was found at all.

B: Discharge unevenness and undischarge failures were observed in not more than 5 nozzles.

C: Discharge unevenness and undischarge failures were observed in not more than 10 nozzles.

D: Discharge unevenness and undischarge failures were observed in 11 nozzles or more.

<Ink Storage Stability>

Individual cartridges were filled with each of the recording inks of Production Examples 1 to 45, and the cartridges were stored at 50° C. for three weeks, and the each of the recording inks was evaluated as to whether there was a thickened viscosity or flocculation of ink particles, based on the following criteria.

[Evaluation Criteria]

A: Neither thickened viscosity nor flocculation was observed at all.

B: Two percent or less of thickened viscosity and flocculation were observed.

C: Five percent or less of thickened viscosity and flocculation were observed.

D: Five percent or more of thickened viscosity and flocculation were observed.

TABLE 1-1

|  | Surface tension | Example 1 | | | | Example 2 | | | | Example 3 | | | |
| --- | --- | --- | --- | --- | --- | --- | --- | --- | --- | --- | --- | --- | --- |
|  |  | Production Ex. 1 | Production Ex. 2 | Production Ex. 3 | Production Ex. 4 | Production Ex. 42 | Production Ex. 5 | Production Ex. 6 | Production Ex. 7 | Production Ex. 8 | Production Ex. 9 | Production Ex 10 | Production Ex. 11 |
| Preparation Ex. 1 |  | 8 |  |  |  | 8 |  |  |  | 8 |  |  |  |
| Preparation Ex. 2 |  |  | 5 |  |  |  | 5 |  |  |  | 5 |  |  |
| Preparation Ex. 3 |  |  |  | 8 |  |  |  | 8 |  |  |  | 8 |  |
| Preparation Ex. 4 |  |  |  |  | 5 |  |  |  | 5 |  |  |  | 5 |
| Preparation Ex. 5 |  |  |  |  |  |  |  |  |  |  |  |  |  |
| Preparation Ex. 6 |  |  |  |  |  |  |  |  |  |  |  |  |  |
| Preparation Ex. 7 |  |  |  |  |  |  |  |  |  |  |  |  |  |
| Preparation Ex. 8 |  |  |  |  |  |  |  |  |  |  |  |  |  |
| Acrylic resin |  | 5.5 | 4 | 3.2 | 4 | 5.5 | 4 | 3.2 | 4 |  |  |  |  |
| Polyester urethane resin |  |  |  |  |  |  |  |  |  | 4 | 4 | 3.2 | 4 |
| Glycerine | 63.3 mN/m | 8.5 | 7 | 7 | 7 | 8.5 | 7 5 | 7.5 | 7.5 | 7 | 7.5 | 7.5 | 7.5 |
| Triethylene glycol | 45.2 mN/m |  |  |  |  |  |  |  |  |  |  |  |  |
| 1,5-pentanediol | 43 2 mN/m |  |  |  |  |  |  |  |  |  |  |  |  |
| 1,3-butanediol | 37.8 mN/m |  |  |  |  | 22.5 | 22.5 | 22.5 |  | 22.5 | 22.5 | 22.5 |  |
| Propylene glycol | 36 mN/m |  |  |  |  |  |  |  |  |  |  |  |  |
| 3-methyl-1,3-butanediol | 32.8 mN/m |  | 21 | 21 | 21 |  |  |  |  | 21 |  |  |  |
| 2-methyl-2,4-pentanediol | 27 mN/m | 17 |  |  |  | 17 |  |  |  |  |  |  |  |
| 2-ethyl-1,3-hexanediol |  | 2 | 2 | 2 | 2 | 2 | 2 | 2 | 2 | 2 | 2 | 2 | 2 |
| Nonionic surfactant |  |  |  |  |  |  |  |  |  |  | 1 | 1 | 1 |
| Fluorochemical surfactant (I) |  | 1 | 1 | 1 | 1 | 1 |  |  |  |  |  |  |  |
| Fluorochemical surfactant (II) |  |  |  |  |  |  | 1 | 1 | 1 |  |  |  |  |
| Fluorochemical surfactant (III) |  |  |  |  |  |  |  |  |  |  | 1 |  |  |
| Sub total |  | 42 | 40 | 42.2 | 40 | 42 | 42 | 44.2 | 42 | 43 | 42 | 44.2 | 42 |
| Water |  | 58 | 60 | 57.8 | 60 | 58 | 58 | 55.8 | 58 | 57 | 58 | 55.8 | 58 |
| Total |  | 100 | 100 | 100 | 100 | 100 | 100 | 100 | 100 | 100 | 100 | 100 | 100 |

TABLE 1-2

|  | Surface tension | Example 4 | | | | Example 5 | | | | Example 6 | | | |
| --- | --- | --- | --- | --- | --- | --- | --- | --- | --- | --- | --- | --- | --- |
|  |  | Production Ex. 12 | Production Ex. 13 | Production Ex. 14 | Production Ex. 15 | Production Ex. 16 | Production Ex. 17 | Production Ex. 18 | Production Ex 19 | Production Ex. 20 | Production Ex. 21 | Production Ex. 22 | Production Ex. 23 |
| Preparation Ex. 1 |  |  |  |  |  | 8 |  |  |  |  |  |  |  |
| Preparation Ex. 2 |  |  |  |  |  |  | 6 |  |  |  |  |  |  |
| Preparation Ex. 3 |  |  |  |  |  |  |  | 8 |  |  |  |  |  |
| Preparation Ex. 4 |  |  |  |  |  |  |  |  | 6 |  |  |  |  |
| Preparation Ex. 5 |  | 8 |  |  |  |  |  |  |  | 7 |  |  |  |
| Preparation Ex. 6 |  |  | 6 |  |  |  |  |  |  |  | 5 |  |  |
| Preparation Ex. 7 |  |  |  | 8 |  |  |  |  |  |  |  | 7 |  |

TABLE 1-2-continued

|  | Surface tension | Example 4 | | | | Example 5 | | | | Example 6 | | | |
| --- | --- | --- | --- | --- | --- | --- | --- | --- | --- | --- | --- | --- | --- |
|  |  | Production Ex. 12 | Production Ex. 13 | Production Ex. 14 | Production Ex. 15 | Production Ex. 16 | Production Ex. 17 | Production Ex. 18 | Production Ex 19 | Production Ex. 20 | Production Ex. 21 | Production Ex. 22 | Production Ex. 23 |
| Preparation Ex. 8 |  |  |  |  | 6 |  |  |  |  |  |  |  | 5 |
| Acrylic resin |  |  |  |  |  | 5.5 | 4 | 5.5 | 4 |  |  |  |  |
| Acrylic urethane resin |  |  |  |  |  |  |  |  |  |  |  |  |  |
| Glycerine | 63.3 mN/m | 8 | 8.2 | 8.2 | 8.2 |  |  |  |  | 12 | 10 | 10 | 10 |
| Triethylene glycol | 45.2 mN/m |  | 25.6 | 25.6 | 25.6 |  |  |  |  |  |  |  |  |
| 1,5-pentanediol | 43.2 mN/m |  |  |  |  | 18 | 17 | 18 |  |  | 28 | 28 | 28 |
| 1,3-butanediol | 37.8 mN/m | 24 |  |  |  |  |  |  |  | 24 |  |  |  |
| Propylene glycol | 36 mN/m |  |  |  |  |  |  |  |  |  |  |  |  |
| 3-methyl-1,3-butanediol | 32.8 mN/m |  |  |  |  |  |  |  |  |  |  |  |  |
| 2-methyl-2,4-pentanediol | 27 mN/m |  |  |  |  | 20 |  |  |  |  |  |  |  |
| 2-ethyl-1,3-hexanediol |  | 2 | 2 | 2 | 2 |  |  |  |  | 2 | 2 | 2 | 2 |
| Nonionic surfactant |  |  |  |  |  |  |  |  |  |  |  |  |  |
| Fluorochemical surfactant (I) |  |  |  |  |  | 1 | 1 | 1 | 1 | 1 | 1 | 1 | 1 |
| Fluorochemical surfactant (II) |  |  |  |  |  |  |  |  |  |  |  |  |  |
| Fluorochemical surfactant (III) |  | 1 | 1 | 1 | 1 |  |  |  |  |  |  |  |  |
| Sub total |  | 43 | 42.8 | 44.8 | 42.8 | 36.5 | 31 | 33.5 | 31 | 46 | 46 | 48 | 46 |
| Water |  | 57 | 57.2 | 55.2 | 57.2 | 63.5 | 69 | 66.5 | 69 | 54 | 54 | 52 | 54 |
| Total |  | 100 | 100 | 100 | 100 | 100 | 100 | 100 | 100 | 100 | 100 | 100 | 100 |

TABLE 1-3

|  | Surface tension | Example 7 | | | | Example 8 | | | | Example 9 | | | |
| --- | --- | --- | --- | --- | --- | --- | --- | --- | --- | --- | --- | --- | --- |
|  |  | Production Ex. 8 | Production Ex. 38 | Production Ex. 39 | Production Ex. 40 | Production Ex. 25 | Production Ex. 26 | Production Ex. 27 | Production Ex. 28 | Production Ex. 29 | Production Ex. 30 | Production Ex. 31 | Production Ex. 32 |
| Preparation Ex. 1 |  | 8 |  |  |  | 8 |  |  |  |  |  |  |  |
| Preparation Ex. 2 |  |  | 6 |  |  |  | 6 |  |  |  |  |  |  |
| Preparation Ex. 3 |  |  |  | 8 |  |  |  | 8 |  |  |  |  |  |
| Preparation Ex. 4 |  |  |  |  | 6 |  |  |  | 6 |  |  |  |  |
| Preparation Ex. 5 |  |  |  |  |  |  |  |  |  | 7 |  |  |  |
| Preparation Ex. 6 |  |  |  |  |  |  |  |  |  |  | 5 |  |  |
| Preparation Ex. 7 |  |  |  |  |  |  |  |  |  |  |  | 7 |  |
| Preparation Ex. 8 |  |  |  |  |  |  |  |  |  |  |  |  | 5 |
| Acrylic resin |  |  |  |  |  | 5.5 | 4 | 5.5 | 4 |  |  |  |  |
| Acrylic urethane resin |  | 4 |  |  |  |  |  |  |  |  |  |  |  |
| Glycerine | 63.3 mN/m | 7 | 8.2 | 8.2 | 8.2 |  |  |  |  | 13 | 10 | 10 | 10 |
| Triethylene glycol | 45.2 mN/m |  | 25.6 | 25.6 | 25.6 |  |  |  |  |  |  |  |  |
| 1,5-pentanediol | 43.2 mN/m |  |  |  |  | 14 | 14 | 14 |  |  | 31 | 31 | 31 |
| 1,3-butanediol | 37.8 mN/m |  |  |  |  |  |  |  |  | 28 |  |  |  |
| Propylene glycol | 36 mN/m |  |  |  |  |  |  |  |  |  |  |  |  |
| 3-methyl-1,3-butanediol | 32.8 mN/m | 21 |  |  |  |  |  |  |  |  |  |  |  |
| 2-methyl-2,4-pentanediol | 27 mN/m |  |  |  |  | 14 |  |  |  |  |  |  |  |
| 2-ethyl-1,3-hexanediol |  |  | 2 | 2 | 2 | 2 | 2 | 2 | 2 | 2 | 2 | 2 | 2 |
| Nonionic surfactant |  |  | 1 | 1 | 1 |  |  |  |  |  |  |  |  |
| Fluorochemical surfactant (I) |  |  |  |  |  | 1 | 1 | 1 | 1 | 1 | 1 | 1 | 1 |
| Fluorochemical surfactant (II) |  |  |  |  |  |  |  |  |  |  |  |  |  |
| Fluorochemical surfactant (III) |  |  | 1 |  |  |  |  |  |  |  |  |  |  |
| Sub total |  | 43 | 42.8 | 44.8 | 42.8 | 30.5 | 27 | 30.5 | 27 | 51 | 49 | 51 | 49 |

TABLE 1-3-continued

|  | Surface tension | Example 7 | | | | Example 8 | | | | Example 9 | | | |
| --- | --- | --- | --- | --- | --- | --- | --- | --- | --- | --- | --- | --- | --- |
|  |  | Production Ex. 8 | Production Ex. 38 | Production Ex. 39 | Production Ex. 40 | Production Ex. 25 | Production Ex. 26 | Production Ex. 27 | Production Ex. 28 | Production Ex. 29 | Production Ex. 30 | Production Ex. 31 | Production Ex. 32 |
| Water |  | 57 | 57.2 | 55.2 | 57.2 | 69.5 | 73 | 69.5 | 73 | 49 | 51 | 49 | 51 |
| Total |  | 100 | 100 | 100 | 100 | 100 | 100 | 100 | 100 | 100 | 100 | 100 | 100 |

TABLE 1-4

|  | Surface tension | Example 10 | | | | Example 11 | | | |
| --- | --- | --- | --- | --- | --- | --- | --- | --- | --- |
|  |  | Production Ex. 41 | Production Ex. 5 | Production Ex. 6 | Production Ex. 7 | Production Ex. 42 | Production Ex. 43 | Production Ex. 44 | Production Ex. 45 |
| Preparation Ex. 1 |  | 8 |  |  |  | 8 |  |  |  |
| Preparation Ex. 2 |  |  | 5 |  |  |  | 5 |  |  |
| Preparation Ex. 3 |  |  |  | 8 |  |  |  | 8 |  |
| Preparation Ex. 4 |  |  |  |  | 5 |  |  |  | 5 |
| Preparation Ex. 5 |  |  |  |  |  |  |  |  |  |
| Preparation Ex. 6 |  |  |  |  |  |  |  |  |  |
| Preparation Ex. 7 |  |  |  |  |  |  |  |  |  |
| Preparation Ex. 8 |  |  |  |  |  |  |  |  |  |
| Acrylic resin |  | 5.5 | 4 | 3.2 | 4 | 5.5 | 4 | 3.2 | 4 |
| Acrylic urethane resin |  |  |  |  |  |  |  |  |  |
| Glycerine | 63.3 mN/m | 8.5 | 7.5 | 7.5 | 7.5 | 8.5 | 7.5 | 7.5 | 7.5 |
| Triethylene glycol | 45.2 mN/m |  |  |  |  |  |  |  |  |
| 1,5-pentanediol | 43.2 mN/m |  |  |  |  |  |  |  |  |
| 1,3-butanediol | 37.8 mN/m |  | 22.5 | 22.5 | 22.5 |  | 22.5 | 22.5 | 22.5 |
| Propylene glycol | 36 mN/m |  |  |  |  |  |  |  |  |
| 3-methyl-1,3-butanediol | 32.8 mN/m |  |  |  |  |  |  |  |  |
| 2-methyl-2,4-pentanediol | 27 mN/m | 17 |  |  |  | 17 |  |  |  |
| 2-ethyl-1,3-hexanediol |  | 2 | 2 | 2 | 2 | 2 | 2 | 2 | 2 |
| Nonionic surfactant |  | 1 |  |  |  |  | 1 | 1 | 1 |
| Fluorochemical surfactant (I) |  |  |  |  |  |  |  |  |  |
| Fluorochemical surfactant (II) |  |  | 1 | 1 | 1 | 1 |  |  |  |
| Fluorochemical surfactant (III) |  |  |  |  |  |  |  |  |  |
| Sub total |  | 42 | 42 | 44.2 | 42 | 42 | 42 | 44.2 | 42 |
| Water |  | 58 | 58 | 55.8 | 58 | 58 | 58 | 55.8 | 58 |
| Total |  | 100 | 100 | 100 | 100 | 100 | 100 | 100 | 100 |

TABLE 1-5

|  | Surface tension | Comparative Example 1 | | | | Comparative Example 2 | | | | Comparative Example 3 | | | |
| --- | --- | --- | --- | --- | --- | --- | --- | --- | --- | --- | --- | --- | --- |
|  |  | Production Ex. 37 | Production Ex. 2 | Production Ex. 3 | Production Ex. 4 | Production Ex. 24 | Production Ex. 2 | Production Ex. 3 | Production Ex. 4 | Production Ex. 33 | Production Ex. 34 | Production Ex. 35 | Production Ex. 36 |
| Preparation Ex. 1 |  | 8 |  |  |  | 8 |  |  |  | 8 |  |  |  |
| Preparation Ex. 2 |  |  | 5 |  |  |  | 5 |  |  |  | 5 |  |  |
| Preparation Ex. 3 |  |  |  | 8 |  |  |  | 8 |  |  |  | 8 |  |
| Preparation Ex. 4 |  |  |  |  | 5 |  |  |  | 5 |  |  |  | 5 |
| Preparation Ex. 5 |  |  |  |  |  |  |  |  |  |  |  |  |  |
| Preparation Ex. 6 |  |  |  |  |  |  |  |  |  |  |  |  |  |
| Preparation Ex. 7 |  |  |  |  |  |  |  |  |  |  |  |  |  |
| Preparation Ex. 8 |  |  |  |  |  |  |  |  |  |  |  |  |  |
| Acrylic resin |  |  | 4 | 3.2 | 4 | 5 | 4 | 3.2 | 4 | 5.5 | 4 | 3.2 | 4 |
| Polyester urethane resin |  |  |  |  |  |  |  |  |  |  |  |  |  |
| Glycerine | 63.3 mN/m | 8 | 7 | 7 | 7 | 9 | 7 | 7 | 7 | 8.5 | 7 | 7 | 7 |
| Triethylene glycol | 45.2 mN/m |  |  |  |  |  |  |  |  |  |  |  |  |
| 1,5-pentanediol | 43.2 mN/m |  |  |  |  |  |  |  |  |  |  |  |  |
| 1,3-butanediol | 37.8 mN/m | 24 |  |  |  |  |  |  |  |  |  |  |  |

TABLE 1-5-continued

|  | Surface tension | Comparative Example 1 | | | | Comparative Example 2 | | | | Comparative Example 3 | | | |
| --- | --- | --- | --- | --- | --- | --- | --- | --- | --- | --- | --- | --- | --- |
|  |  | Production Ex. 37 | Production Ex. 2 | Production Ex. 3 | Production Ex. 4 | Production Ex. 24 | Production Ex. 2 | Production Ex. 3 | Production Ex. 4 | Production Ex. 33 | Production Ex. 34 | Production Ex. 35 | Production Ex 36 |
| Propylene glycol | 36 mN/m |  |  |  |  |  |  |  |  |  |  |  |  |
| 3-methyl-1,3-butanediol | 32.8 mN/m |  | 21 | 21 | 21 | 18 | 21 | 21 | 21 |  | 21 | 21 | 21 |
| 2-methyl-2,4-pentanediol | 27 mN/m |  |  |  |  |  |  |  |  | 17 |  |  |  |
| 2-ethyl-1,3-hexanediol |  | 2 | 2 | 2 | 2 | 2 | 2 | 2 | 2 | 2 | 2 | 2 | 2 |
| Nonionic surfactant |  |  |  |  |  |  |  |  |  |  |  |  |  |
| Fluorochemical surfactant (I) |  | 1 | 1 | 1 | 1 | 1 | 1 | 1 | 1 |  |  |  |  |
| Fluorochemical surfactant (II) |  |  |  |  |  |  |  |  |  |  |  |  |  |
| Fluorochemical surfactant (III) |  |  |  |  |  |  |  |  |  |  |  |  |  |
| Sub total |  | 43 | 40 | 42.2 | 40 | 43 | 40 | 42.2 | 40 | 41 | 39 | 41.2 | 39 |
| Water |  | 57 | 60 | 57.8 | 60 | 57 | 60 | 57.8 | 60 | 59 | 61 | 58.8 | 61 |
| Total |  | 100 | 100 | 100 | 100 | 100 | 100 | 100 | 100 | 100 | 100 | 100 | 100 |

TABLE 2-1

|  |  | Example 1 | | | | Example 2 | | | | Example 3 | | | |
| --- | --- | --- | --- | --- | --- | --- | --- | --- | --- | --- | --- | --- | --- |
|  |  | Production Ex. 1 | Production Ex. 2 | Production Ex. 3 | Production Ex. 4 | Production Ex. 42 | Production Ex. 5 | Production Ex. 6 | Production Ex. 7 | Production Ex. 8 | Production Ex. 9 | Production Ex. 10 | Production Ex. 11 |
| Viscosity | mPa·s | 7.7 | 7.8 | 8.0 | 8.2 | 7.7 | 8.2 | 8.2 | 7.8 | 8.1 | 8.1 | 8.1 | 7.8 |
| Surface tension | mN/m | 25.7 | 25.2 | 25.4 | 25.9 | 25.7 | 25.2 | 25.4 | 25.9 | 26.0 | 31.5 | 30.2 | 32.2 |
| Color bleed |  |  | A |  |  |  | B |  |  |  | A |  |  |
| Secondary color beading |  |  | A |  |  |  | B |  |  |  | A |  |  |
| Cockling |  |  | A |  |  |  | B |  |  |  | A |  |  |
| Contact angle (degree) |  | 19 | 20 | 20 | 18 | 18 | 21 | 21 | 19 | 18 | 22 | 23 | 20 |
| Discharge stability |  | A | A | A | A | A | A | A | A | A | A | A | A |
| Storage stability |  | A | A | A | A | A | A | A | A | A | A | A | A |

TABLE 2-2

|  |  | Example 4 | | | | Example 5 | | | | Example 6 | | | |
| --- | --- | --- | --- | --- | --- | --- | --- | --- | --- | --- | --- | --- | --- |
|  |  | Production Ex. 12 | Production Ex. 13 | Production Ex. 14 | Production Ex. 15 | Production Ex. 16 | Production Ex. 17 | Production Ex. 18 | Production Ex. 19 | Production Ex. 20 | Production Ex. 21 | Production Ex. 22 | Production Ex. 23 |
| Viscosity | mPa·s | 8.5 | 7.9 | 8.1 | 8.1 | 7.2 | 6.5 | 6.9 | 6.4 | 9.6 | 11.2 | 10.8 | 10.6 |
| Surface tension | mN/m | 25.8 | 25.4 | 25.4 | 26.1 | 25.0 | 24.8 | 25.1 | 25.2 | 24.9 | 24.6 | 25.0 | 25.0 |
| Color bleed |  |  | A |  |  |  | B |  |  |  | B |  |  |
| Secondary color beading |  |  | A |  |  |  | B |  |  |  | B |  |  |
| Cockling |  |  | A |  |  |  | B |  |  |  | A |  |  |
| Contact angle (degree) |  | 20 | 22 | 22 | 21 | 17 | 21 | 22 | 18 | 18 | 20 | 22 | 18 |
| Discharge stability |  | A | A | A | A | B | B | B | B | B | B | B | B |
| Storage stability |  | A | A | A | A | A | A | A | A | B | B | B | B |

TABLE 2-3

| | | Example 7 | | | | Example 8 | | | | Example 9 | | | |
|---|---|---|---|---|---|---|---|---|---|---|---|---|---|
| | | Production Ex. 8 | Production Ex. 38 | Production Ex. 39 | Production Ex. 40 | Production Ex. 25 | Production Ex. 26 | Production Ex. 27 | Production Ex. 28 | Production Ex. 29 | Production Ex. 30 | Production Ex. 31 | Production Ex. 32 |
| Viscosity | mPa·s | 8.1 | 7.9 | 8.1 | 8.1 | 4.6 | 5.1 | 5.3 | 5 | 22.4 | 18.9 | 20.1 | 19.1 |
| Surface tension | mN/m | 25.3 | 31.9 | 30.6 | 32.5 | 25.7 | 25.5 | 25.8 | 26.1 | 26.1 | 25.6 | 25.7 | 26.2 |
| Color bleed | | | A | | | | B | | | | B | | |
| Secondary color beading | | | A | | | | C | | | | C | | |
| Cockling | | | A | | | | C | | | | A | | |
| Contact angle (degree) | | 18 | 22 | 22 | 21 | 19 | 21 | 21 | 19 | 18 | 20 | 20 | 18 |
| Discharge stability | | A | A | A | A | A | A | A | A | C | C | C | C |
| Storage stability | | A | A | A | A | A | A | A | A | B | B | B | B |

TABLE 2-4

| | | Example 10 | | | | Example 11 | | | |
|---|---|---|---|---|---|---|---|---|---|
| | | Production Ex. 41 | Production Ex. 5 | Production Ex. 6 | Production Ex. 7 | Production Ex. 42 | Production Ex. 43 | Production Ex. 44 | Production Ex. 45 |
| Viscosity | mPa·s | 7.5 | 7.8 | 8.0 | 8.2 | 7.7 | 7.6 | 7.8 | 8.1 |
| Surface tension | mN/m | 29.8 | 25.2 | 25.4 | 25.9 | 25.7 | 31.2 | 30.0 | 32.1 |
| Color bleed | | | C | | | | B | | |
| Secondary color beading | | | A | | | | A | | |
| Cockling | | | A | | | | A | | |
| Contact angle (degree) | | 25 | 20 | 20 | 18 | 19 | 26 | 27 | 27 |
| Discharge stability | | A | A | A | A | A | A | A | A |
| Storage stability | | A | A | A | A | A | A | A | A |

TABLE 2-5

| | | Comparative Example 1 | | | | Comparative Example 2 | | | | Comparative Example 3 | | | |
|---|---|---|---|---|---|---|---|---|---|---|---|---|---|
| | | Production Ex. 37 | Production Ex. 2 | Production Ex. 3 | Production Ex. 4 | Production Ex. 24 | Production Ex. 2 | Production Ex. 3 | Production Ex. 4 | Production Ex. 33 | Production Ex. 34 | Production Ex. 35 | Production Ex. 36 |
| Viscosity | mPa·s | 8.5 | 7.8 | 8.0 | 8.2 | 8.1 | 7.8 | 8.0 | 8.2 | 7.4 | 7.2 | 7.3 | 7.2 |
| Surface tension | mN/m | 25.4 | 25.2 | 25.4 | 25.9 | 25.1 | 25.2 | 25.4 | 25.9 | 41.0 | 39.6 | 38.9 | 40.2 |
| Color bleed | | | D | | | | D | | | | D | | |
| Secondary color beading | | | D | | | | D | | | | D | | |
| Cockling | | | B | | | | B | | | | C | | |
| Contact angle (degree) | | 20 | 20 | 20 | 18 | 18 | 20 | 20 | 18 | 45 | 43 | 42 | 48 |
| Discharge stability | | A | A | A | A | A | A | A | A | D | D | D | D |
| Storage stability | | A | A | A | A | A | A | A | A | D | D | D | D |

The recording ink set and the recording ink of the present invention is excellent in dry property, discharge stability, and storage stability and allows excellent image formation not only on regular paper but also on poorly water-absorbable printing coated paper whose surface is applied with an inorganic pigment, without substantially causing color bleed, and therefore, the recording ink set and the recording ink can be suitably used for ink records, inkjet recording apparatuses, and inkjet recording method.

The recording method and the inkjet recording apparatus of the present invention can be applied to various types of recording based on inkjet recording method and can be particularly suitably applied to, for example, inkjet recording printers, facsimiles, copiers, and recording printer/fax/copy complex machines.

The invention claimed is:

1. A recording ink set comprising:
  a black ink,
  a cyan ink,
  a magenta ink, and
  a yellow ink, each of which comprises water, a water-insoluble color material, a water-soluble organic solvent, and a surfactant,
  wherein the black ink and at least one of the inks other than the black ink each comprise a different water-soluble organic solvent; and the surface tension of all the water-soluble organic solvent(s) used only for the inks other than the black ink is higher than that of the water-soluble organic solvent used only for the black ink, wherein the contact angle between a 2 μL ink drop and a recording medium, when measured 100 ms after the drop of each ink of the recording ink set is dropped on the recording medium, is 15 degrees to 35 degrees, and the recording medium is provided with a coating layer on at least one surface of a support and has a transfer amount of pure water to the recording medium, measured by the use of a dynamic scanning absorptometer, for a contact time of 100 ms being 3 mL/m$^2$ to 15 mL/m$^2$.

2. The recording ink set according to claim 1, wherein the surface tension of each ink of the recording ink set at a temperature of 25° C. is 20 mN/m to 40 mN/m.

3. The recording ink set according to claim 1, wherein the viscosity difference between at least one ink of the recording ink set which comprises at least the black ink, the cyan ink, the magenta ink, and the yellow ink, and the other inks of the recording ink set is 0 mPa·s to 0.8 mPa·s.

4. The recording ink set according to claim 1, wherein the viscosity of each ink of the recording ink set at a temperature of 25° C. is 6 mPa·s to 20 mPa·s.

5. The recording ink set according to claim 1, wherein the water content of each ink is 40% by mass to 60% by mass, and the content of each of the water-soluble organic solvents in each ink is 15% by mass to 40% by mass.

6. The recording ink set according to claim 1, further comprising a penetrant which comprises a diol compound having 7 to 11 carbon atoms.

7. The recording ink set according to claim 1, wherein the surfactant is a fluorochemical surfactant, and the fluorochemical surfactant is represented by at least one selected from the following structural formulas (I), (II), and (III),

$$CF_3CF_2(CF_2CF_2)_m—CH_2CH_2O(CH_2CH_2O)_nH \quad (I)$$

where "m" is an integer of 0 to 10, and "n" is an integer of 1 to 40,

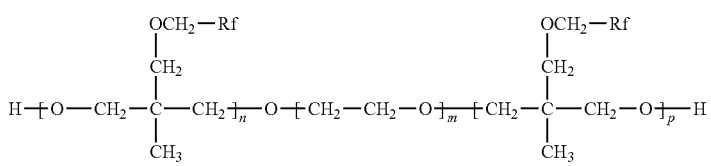

(II)

where "Rf" represents a fluorine-containing group, and "m", "n", and "p" are respectively an integer,

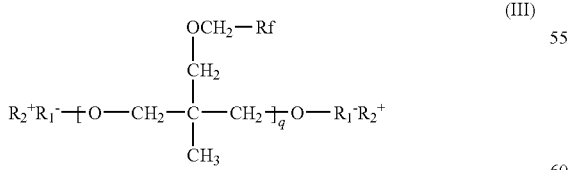

(III)

where "Rf" represents a fluorine-containing group; $R_1$ represents an anionic group; $R_2$ represents a cationic group; and "q" is an integer.

8. The recording ink set according to claim 1, further comprising resin fine particles having a volume average particle diameter of 30 nm to 200 nm.

9. Recording inks comprising:
water,
a water-insoluble color material,
water-soluble organic solvents, and
a surfactant,
wherein the recording inks comprises a black ink and at least one selected from a cyan ink, a magenta ink, and a yellow ink; the black ink and at least one of the inks other than the black ink each comprise a different water-soluble organic solvent; and the surface tension of all the water-soluble organic solvent(s) used only for the inks other than the black ink is higher than that of the water-soluble organic solvent used only for the black ink.

10. A recording method comprising:
recording an image on a recording medium which is provided with a coating layer on at least one surface of a support using a recording ink set, the recording ink set comprising:
a black ink,
a cyan ink,
a magenta ink, and
a yellow ink, each of which comprises water, a water-insoluble color material, a water-soluble organic solvent, and a surfactant,
wherein the black ink and at least one of the inks other than the black ink each comprise a different water-soluble organic solvent; and the surface tension of all the water-soluble organic solvent(s) used only for the inks other than the black ink is higher than that of the water-soluble organic solvent used only for the black ink,
wherein the transfer amount of pure water to the recording medium measured by the use of a dynamic scanning absorptometer, for a contact time of 100 ms is 3 mL/m$^2$ to 15 mL/m$^2$.

11. An inkjet recording apparatus comprising:
an ink drop discharge unit configured to discharge ink drops to record an image by applying stimulation to each ink of a recording ink set, the recording ink set comprising:

a black ink, a cyan ink, a magenta ink, and a yellow ink, each of which comprises water, a water-insoluble color material, a water-soluble organic solvent, and a surfactant, wherein the black ink and at least one of the inks other than the black ink each comprise a different water-soluble organic solvent; and the surface tension of all the water-soluble organic solvent(s) used only for the inks other than the black ink is higher than that of the water-soluble organic solvent used only for the black ink.

12. The inkjet recording apparatus claim 11, wherein the size of discharged ink droplets is 3 pL to 40 pL; the recording speed is 5 m/s to 20 m/s; the frequency of the applied stimulation is 1 kHz or more; and the resolution is 300 dpi or more.

13. The inkjet recording apparatus according to claim 11, wherein the stimulation is at least one selected from heat, pressure, vibration and light.

14. The inkjet recording apparatus according to claim 13, wherein the size of discharged ink droplets is 3 pL to 40 pL; the recording speed is 5 m/s to 20 m/s; the frequency of the applied stimulation is 1 kHz or more; and the resolution is 300 dpi or more.

15. An ink record comprising:
- an image recorded on a recording medium using a recording ink set comprising:
- a black ink,
- a cyan ink,
- a magenta ink, and
- a yellow ink, each of which comprises water, a water-insoluble color material, a water-soluble organic solvent, and a surfactant,
- wherein the black ink and at least one of the inks other than the black ink each comprise a different water-soluble organic solvent; and the surface tension of all the water-soluble organic solvent(s) used only for the inks other than the black ink is higher than that of the water-soluble organic solvent used only for the black ink.

16. An ink cartridge comprising:
- a recording ink set wherein the recording ink set is contained in a container, and the recording ink set comprises:
- a black ink,
- a cyan ink,
- a magenta ink, and
- a yellow ink, each of which comprises water, a water-insoluble color material, a water-soluble organic solvent, and a surfactant,
- wherein the black ink and at least one of the inks other than the black ink each comprise a different water-soluble organic solvent; and the surface tension of all the water-soluble organic solvent(s) used only for the inks other than the black ink is higher than that of the water-soluble organic solvent used only for the black ink.

* * * * *